(12) United States Patent
Kroyzer et al.

(10) Patent No.: US 12,375,023 B2
(45) Date of Patent: Jul. 29, 2025

(54) ADJUSTABLE SUPPORTING STRUCTURE FOR ONE OR MORE PHOTOVOLTAIC PANELS

(71) Applicant: Solargik, Ltd., Jerusalem (IL)

(72) Inventors: Gil Kroyzer, Jerusalem (IL); Israel Kroizer, Jerusalem (IL); Morag Am Shallem, Jerusalem (IL); Efrat Zocher Arica, Jerusalem (IL); Hadas Weisz, Tel Aviv (IL); Bryon Roos Gomberg, Kfar Saba (IL)

(73) Assignee: Solargik, Ltd., Jerusalem (IL)

( * ) Notice: Subject to any disclaimer, the term of this patent is extended or adjusted under 35 U.S.C. 154(b) by 84 days.

(21) Appl. No.: 18/511,685

(22) Filed: Nov. 16, 2023

(65) Prior Publication Data
US 2024/0171114 A1 May 23, 2024

Related U.S. Application Data

(60) Provisional application No. 63/426,194, filed on Nov. 17, 2022.

(51) Int. Cl.
*H02S 20/10* (2014.01)
*H02S 20/30* (2014.01)
*H02S 30/10* (2014.01)

(52) U.S. Cl.
CPC .............. *H02S 20/10* (2014.12); *H02S 20/30* (2014.12); *H02S 30/10* (2014.12)

(58) Field of Classification Search
CPC ........... H02S 20/10; H02S 20/30; H02S 30/10
See application file for complete search history.

(56) References Cited

U.S. PATENT DOCUMENTS 10,138,874 B2  11/2018  Angoli et al.
10,709,074 B2   7/2020  Surany
(Continued)

FOREIGN PATENT DOCUMENTS

CN      206712722 U    12/2017
EP       2837899 A1     2/2015
(Continued)

OTHER PUBLICATIONS

A. Adams; "Mechanical Grape Harvesters, Latest generation of harvesters is faster and gentler"; Wine Business Analytics; May 2017, retrieved from https://winebusinessanalytics.com/features/article/183875/Mechanical-Grape-Harvesters.
(Continued)

*Primary Examiner* — Jayne L Mershon
(74) *Attorney, Agent, or Firm* — Momentum IP; Marc Van Dyke

(57) ABSTRACT

Various implementations described herein are directed to an apparatus including an assembly for supporting a plurality of photovoltaic panels above a ground. The assembly may be supported by one or more poles. Each of the plurality of poles may include a fixed portion configured to be fixed on the ground and a moveable portion configured to be moveably coupled to at least one of the fixed portion or the assembly. The moveable portion may have a closed configuration. At the closed configuration, the moveable portion may support the assembly by being coupled to the fixed portion, and an open configuration. At the open configuration, the moveable portion may be detached from at least one of the fixed portion and the assembly.

20 Claims, 12 Drawing Sheets

(56) References Cited

U.S. PATENT DOCUMENTS

| | | | |
|---|---|---|---|
| 11,309,829 | B2 | 4/2022 | Sgarrella |
| 2011/0120523 | A1 | 5/2011 | Silver |
| 2012/0216850 | A1 | 8/2012 | Chu |
| 2014/0283894 | A1 | 9/2014 | Silver |
| 2019/0312543 | A1 | 10/2019 | Sgarrella |
| 2022/0109395 | A1* | 4/2022 | McRae ............... H02J 7/0042 |

FOREIGN PATENT DOCUMENTS

| | | |
|---|---|---|
| HR | P20080288 A2 | 12/2009 |
| JP | 2015017489 A | 1/2015 |
| JP | 2017012007 A | 1/2017 |

OTHER PUBLICATIONS

"6030 Multi-Function Grape Harvester"; OXBO; retrieved from https://oxbo.com/products/oxbo-6030/#2194463-specifications.

Pellenc America Home Page, retireved from https://pellencus.com/.

Braud Grape Harvester; New Holland; retrieved from https://agriculture.newholland.com/en-us/nar/products/grape-and-olive-harvesters/braud-grape-harvester.

O. Madgett, "Harvest optimisation technology, a smart move for Australia's viticulture industry", GrowAG, Jul. 19, 2021, retrieved from https://www.growag.com/highlights/article/harvest-optimisation-technology-a-smart-move-for-australias-viticulture-industry#:~:text=Aussie%20Wine%20Group%20(AWG)%20creates,within%20the%20wine%20making%20process.

"Agrivoltaics—solar panels on top, potatoes down below," En:Former, Nov. 22, 2019, retrieved from https://www.en-former.com/en/agrivoltaics/.

"Agri-PV: solar farm and farmland in one," En: Former, Dec. 7, 2020, retrieved from https://www.en-former.com/en/agri-pv-solar-farm-and-farmland-in-one/.

F. Crellin, "Solar panels help French winemaker keep climate change at bay," Reuters, Oct. 8, 2021, retrieved from https://www.reuters.com/business/environment/solar-panels-help-french-winemaker-keep-climate-change-bay-2021-10-04/.

Sun'Agri Home Page, retrieved from https://sunagri.fr/en/.

"Drones & Robots—New Technologies in Agriculture," Ideagro, Nov. 5, 2014, retrieved from https://ideagro.es/en/drones-robots-nuevas-tecnologias-en-agricultura/.

G. Deboutte, "Agrivoltaics for viticulture," PV Magazine, Sep. 21, 2021, retrieved from https://www.pv-magazine.com/2021/09/21/agrivoltaics-for-viticulture/.

Jan. 22, 2024—EP Search Report—EP App. No. 23210556.9.

* cited by examiner

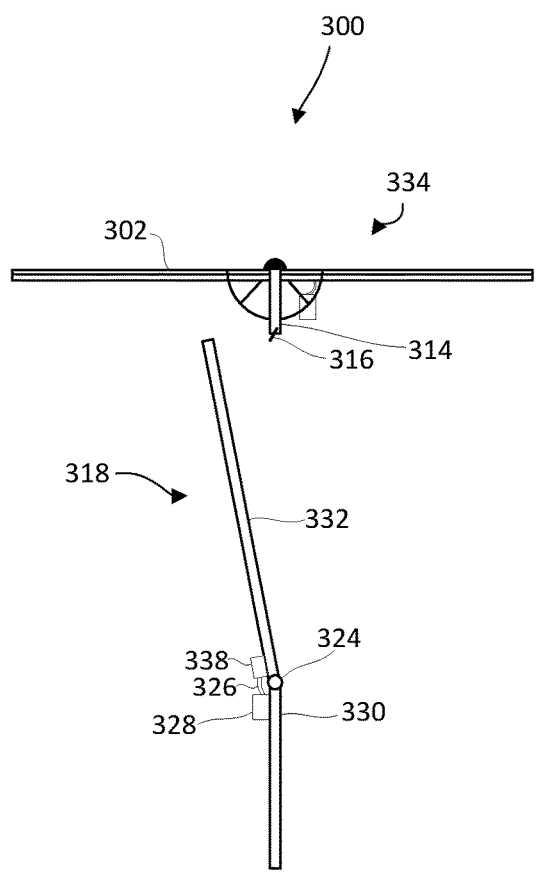
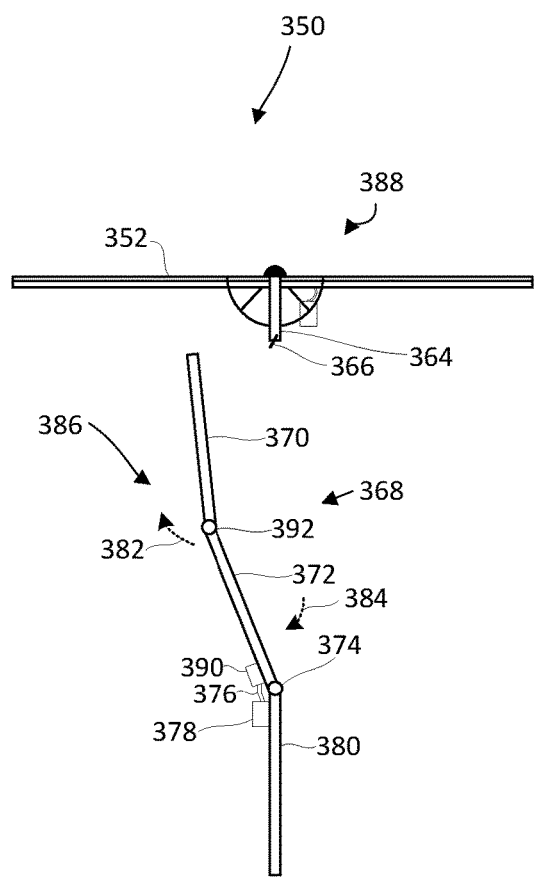
FIG. 3A
FIG. 3B

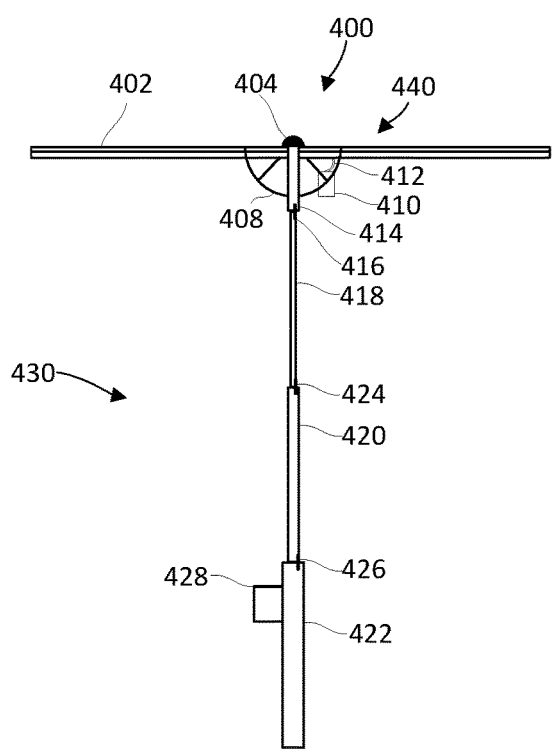
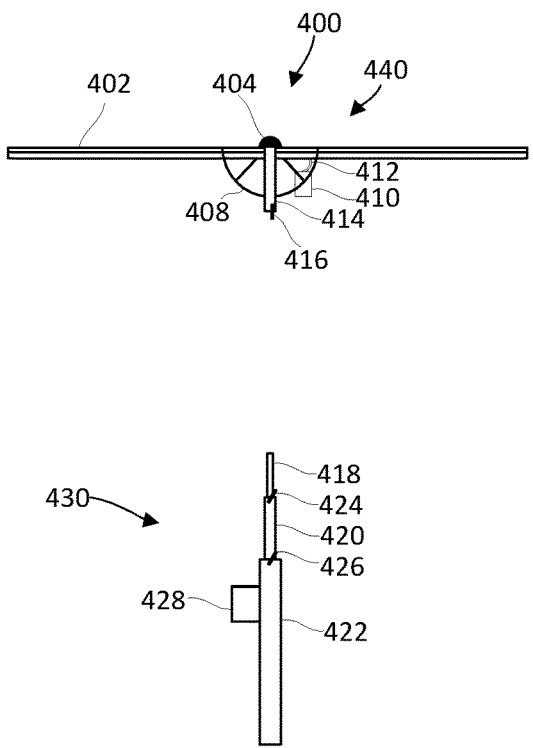
FIG. 4A
FIG. 4B
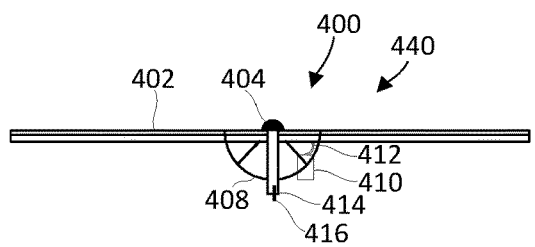
FIG. 4C

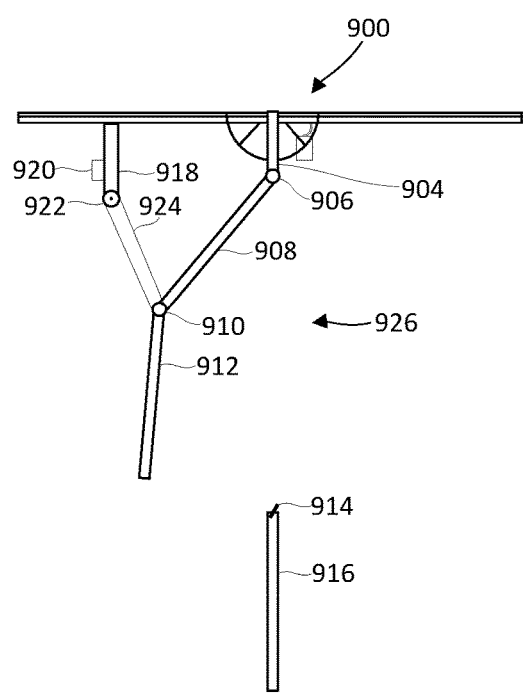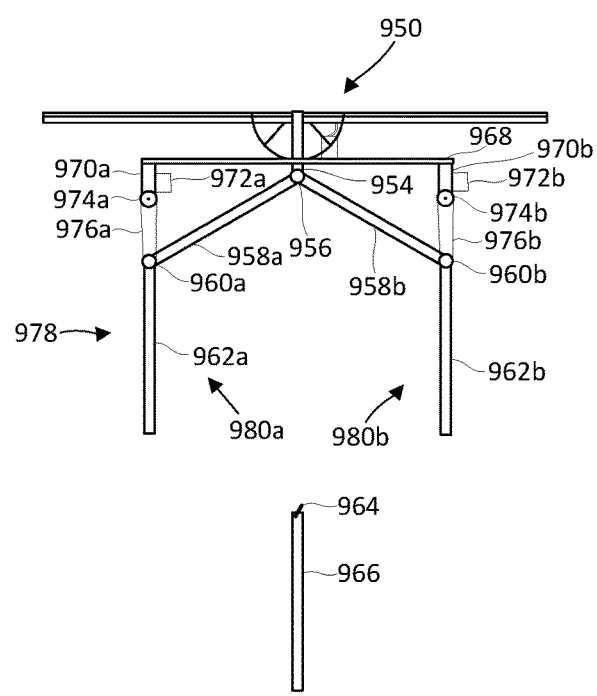
FIG. 9A
FIG. 9B

ADJUSTABLE SUPPORTING STRUCTURE FOR ONE OR MORE PHOTOVOLTAIC PANELS

CROSS-REFERENCE TO RELATED APPLICATIONS

This application claims priority to U.S. Provisional Application 63/426,194, filed Nov. 17, 2022, the contents of which are incorporated herein by reference in their entireties.

BACKGROUND

Renewable energy sources, such as solar panels, have become a common power generating system which enables homes and businesses to produce power. The solar panels are generally large and require a wide area for use, and are therefore usually placed on top of rooftops of buildings. In areas where there are no buildings, the solar panels are generally placed on the ground, thereby taking up space that can be otherwise used.

SUMMARY

The following presents a simplified summary of various concepts disclosed herein. This summary is not an extensive overview and is not intended to identify key or critical elements or to delineate the scope of the claims. This summary is not intended to limit or constrain the present disclosure.

Systems, apparatuses, and methods are described that may be configured to enable tractors to harvest crops grown under one or more photovoltaic panels. The one or more photovoltaic panels may be supported by one or more assemblies as described herein, which are held by one or more poles. At least a portion of the one or more poles may be adaptive or modular. At least a portion of the one or more poles may include a moveable portion, which at a closed configuration may be coupled between the assembly and a fixed portion on the ground. The moveable portion may be moveable, or in other words, may change the configuration of the pole from the closed configuration to an open configuration, wherein at the open configuration a tractor may be able to harvest crops by entering the area between the assembly and the ground.

An apparatus is described herein, wherein the apparatus includes an assembly supporting a plurality of photovoltaic panels above a ground, a plurality of poles configured to support the assembly and the plurality of photovoltaic panels, wherein each of the plurality of poles includes: a fixed portion configured to be fixed on the ground, a moveable portion configured to be moveably coupled to at least one of the fixed portion or the assembly, the moveable portion is configured to: at a closed configuration, support the assembly by being coupled to the fixed portion, and at an open configuration, be detached from at least one of the fixed portion or the assembly.

An apparatus is described herein, wherein the apparatus includes an assembly supporting a plurality of photovoltaic panels above a ground, a plurality of poles configured to support the assembly and the plurality of photovoltaic panels, wherein each of the plurality of poles includes: a fixed portion configured to be fixed on the ground, and a moveable portion configured to be moveably coupled to the fixed portion and the assembly, wherein the moveable portion is coupled to: the assembly via a first axis of rotation, and the fixed portion via a second axis of rotation.

An apparatus is described herein, wherein the apparatus includes an assembly supporting a plurality of photovoltaic panels above a ground, a plurality of poles configured to support the assembly and the plurality of photovoltaic panels, wherein each of the plurality of poles includes: a fixed portion configured to be fixed on the ground, a moveable portion configured to be moveably coupled to at least one of the fixed portion or the assembly, the moveable portion may be configured to: at a closed configuration, support the assembly by being coupled to fixed portion, and at an open configuration, be detached from at least one of: the fixed portion or the assembly, wherein the moveable portion includes an anchor, and wherein the moveable portion of a first pole of the plurality of poles is configured to lock onto a second pole of the plurality of poles using the anchor.

A system is described herein, wherein the system includes a plurality of photovoltaic panels, and an apparatus including: an assembly supporting the plurality of photovoltaic panels above a ground, a plurality of poles configured to support the assembly and the plurality of photovoltaic panels, wherein each of the plurality of poles includes: a fixed portion configured to be fixed on the ground, a moveable portion configured to be moveably coupled to at least one of the fixed portion and the assembly, the moveable portion configured to: at a closed configuration, support the assembly by being coupled to fixed portion, and at an open configuration, be detached from at least one of the fixed portion or the assembly.

A method is described herein, wherein the method includes providing an assembly configured to support at least one photovoltaic panel above an object, providing a pole including a fixed portion and a moveable portion, fixing the fixed portion of the pole to a ground, coupling, for a closed configuration, the movable portion of the pole to the fixed portion and the assembly so that the moveable portion supports the assembly by being coupled to fixed portion, and decoupling, for an open configuration and to accommodate the object in a space under the assembly, the moveable portion from at least one of: the fixed portion or the assembly.

A method is described herein, wherein the method includes providing an assembly configured to support at least one photovoltaic panel above an object, providing a pole including a fixed portion and a moveable portion, wherein the fixed portion is fixed to a ground, and wherein for a closed configuration, the movable portion is coupled to the fixed portion and the assembly, and switching the pole from the closed configuration to an open configuration, wherein at the closed configuration the moveable portion is configured to support the assembly by being coupled to the fixed portion, and wherein at the open configuration, the moveable portion is detached from at least one of: the fixed portion or the assembly.

The moveable portion may include a first end configured to couple to the fixed portion, and wherein at the open configuration, the first end may be detached from the fixed portion.

The moveable portion may include a second end configured to couple to the assembly, and wherein at a second open configuration, the second end may be detached from the assembly. At the closed configuration, the moveable portion may be locked between the assembly and the fixed portion.

The apparatus may include a lock configured to lock the moveable portion between the assembly and the fixed portion. The lock may be configured to automatically lock, based on the moveable portion contacts a portion of the assembly or the fixed portion, the moveable portion between the assembly and the fixed portion. The automatic lock may include an electromagnetic lock. The electromagnetic lock may include one or more magnetic or electromagnetic components positioned on one or more portions of the one or more poles. The lock may be configured to lock the moveable portion to the assembly. The lock may be configured to lock the moveable portion to the fixed portion. The apparatus may include a lock configured to couple to the first end and the fixed portion, wherein at the closed configuration, the lock is configured to fix the position of the moveable portion in relation to the fixed portion.

The lock may include a lever. The apparatus may include an actuator configured to switch between the open configuration and the closed configuration. The lock may be configured to be released by the actuator. The apparatus may include a controller configured to operate the actuator. The actuator may include a motor and a gear. The controller may be configured to switch the lock from a locked state to an unlocked state. The actuator may be configured to rotate the moveable portion around the axis of rotation of the hinge.

Each of the plurality of poles further may include a hinge disposed between the second end and the assembly, and wherein the hinge may be configured to rotate the moveable portion around an axis of rotation of the hinge. The hinge may be configured to lock the moveable portion at the closed configuration such that a position of the moveable portion in relation to the assembly may be fixed.

The moveable portion may include a first section, a second section, and a second hinge, and wherein the first section may be moveably coupled to the second section via the second hinge. The second hinge may be configured to lock a connected portion of the first section and a connected portion of the second section such that the position of the first section is fixed in relation to the second section. The controller may be configured to switch the second hinge from a locked state to an unlocked state. The actuator may be configured to rotate the first section around an axis of rotation of the second hinge.

The fixed portion may include a cavity configured to receive the moveable portion. The second end may be configured to detach from the assembly, and wherein the moveable portion may include a cavity configured to receive the fixed portion. The apparatus may include a lock configured to couple to the second end and the assembly, wherein at the closed configuration, the lock is configured to fix the position of the moveable portion in relation to the assembly. The controller may be configured to switch the lock from a locked state to an unlocked state.

The actuator may be configured to slide the moveable portion towards the fixed portion. The moveable portion may include a first section and a second section, wherein the first section may be removably coupled to the second section, and wherein the second section may include a cavity configured to receive the first section. The first section and the second section may be concentric.

The apparatus may include a second lock, wherein at the closed configuration, the second lock may be coupled to the first section and the second section, and wherein the second lock may be configured to fix the position of the first section in relation to the second section. The controller may be configured to switch the second lock from a locked state to an unlocked state. The actuator may be configured to slide the second section towards the first section.

The distance between the assembly and the ground may be at least two meters. The fixed portion may include a base configured to enable the moveable portion to slide thereon. The base may include a rail.

The fixed portion may include a trellis configured to enable crops to grow on the fixed portion. The trellis may include at least one of: stakes, posts, or wires. The assembly may include a section configured to receive a holder of a tractor. The assembly may include a sensor configured to maintain a spatial orientation of at least one of the plurality of photovoltaic panels. The moveable portion may include a U-shape, and wherein a recess of the U-shape may be configured to surround the crop.

The first pole and the second pole of the plurality of poles may be neighboring poles. The moveable portion of the first pole may include two rods, and wherein each of the two rods may be configured to couple to a different neighboring pole.

BRIEF DESCRIPTION OF THE DRAWINGS

The present disclosure is illustrated by way of example and is not limited in the accompanying figures in which like reference numerals indicate similar elements and in which:

FIG. 3A and FIG. 3B show a pole with a moveable portion, supporting a photovoltaic panel;

FIG. 4A, FIG. 4B, and FIG. 4C show a pole with a moveable portion, supporting a photovoltaic panel;

FIG. 9A and FIG. 9B show a pole supporting a photovoltaic panel; and

DETAILED DESCRIPTION

In the following description of, reference is made to the accompanying drawings, which form a part hereof, and in which are shown, by way of illustration, various examples of the disclosure. It is to be understood that the examples shown and/or described are non-exclusive, and other examples may be practiced, and structural and functional modifications may be made without departing from the scope of the present disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1A:
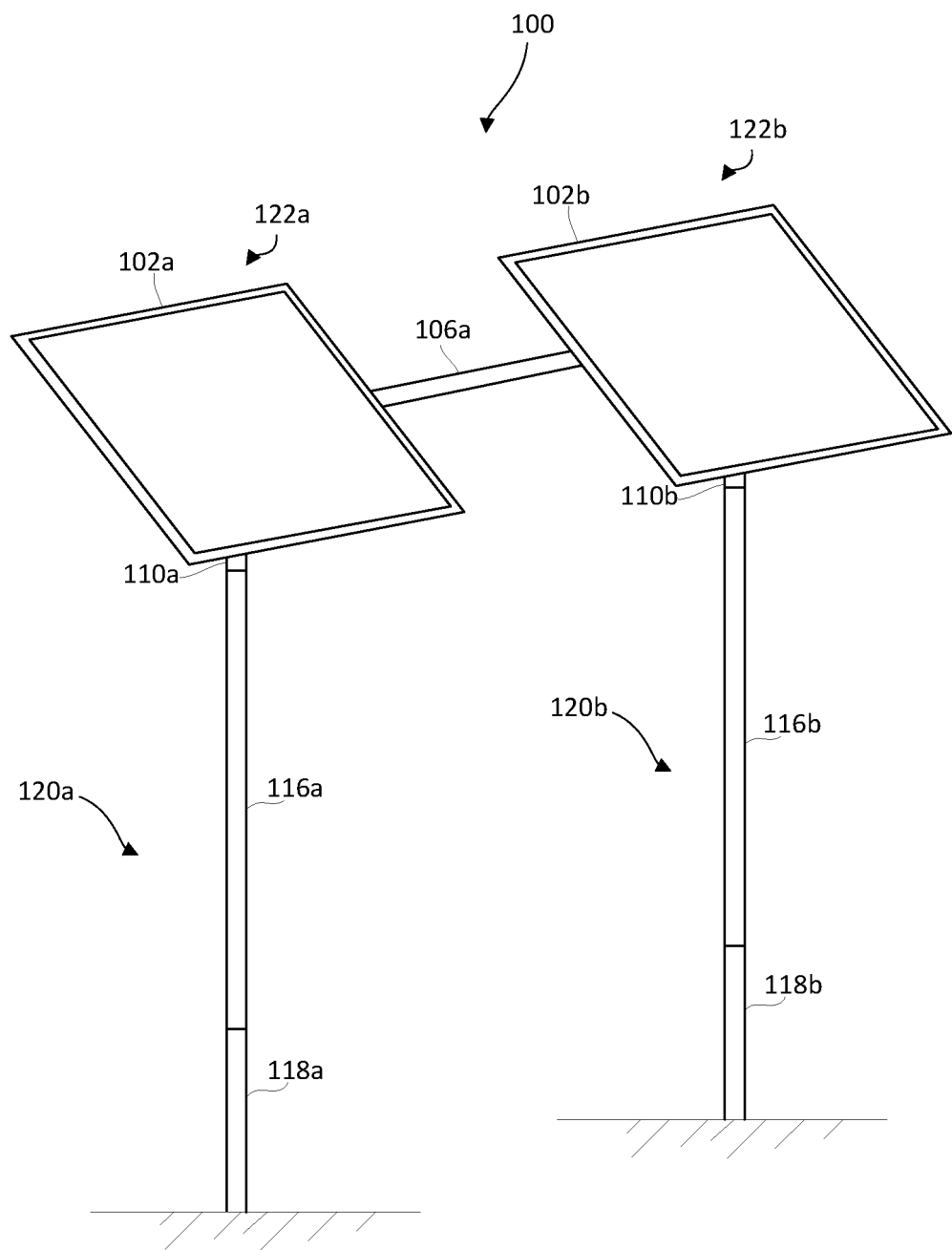
FIG. 1A and FIG. 1B show a plurality of poles supporting a plurality of photovoltaic panels.
Figure 1B:
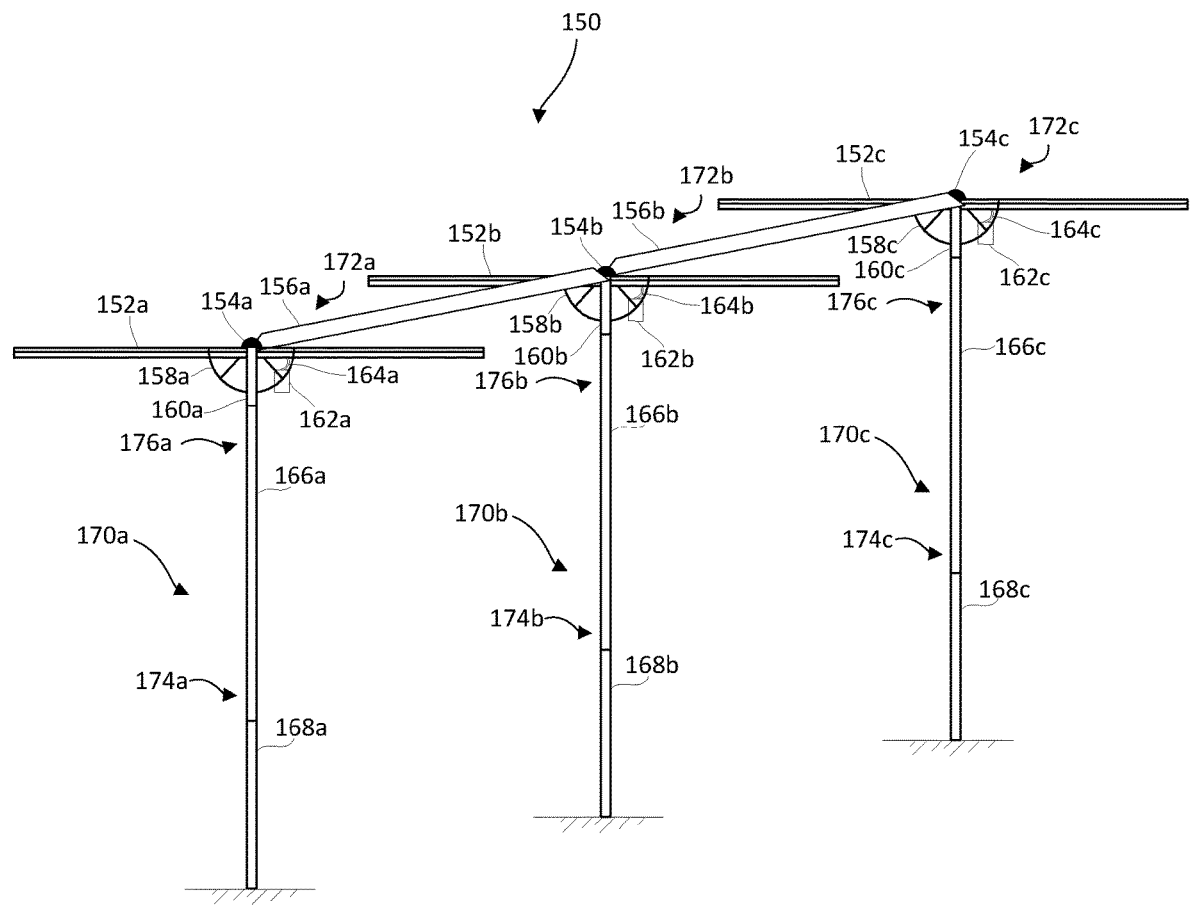

Reference is now made to FIG. 1A and FIG. 1B, which show a plurality of poles supporting a plurality of photovoltaic panels. As depicted in FIGS. 1A and 1B, the photovoltaic panels are held by a support structure. The support structure may include an apparatus configured to enable harvesting (or reaping) of crops that grow below the photovoltaic panels. The apparatus may be configured to enable cultivation, watering (irrigation), and spraying of the crops that grow below the photovoltaic panels. The support structure for holding the photovoltaic panels may include a plurality of poles which, at a closed configuration thereof, may be in the way of the devices (e.g., tractors, reapers, and harvesters, which may be used to harvest the crops, or any other devices that may be placed under one or more photovoltaic panels). The plurality of poles may have an open configuration in which a moveable portion thereof is moved, thereby making way for the devices (e.g., used to harvest the crops or used for other purposes).

The apparatus as described herein may include a connector 106/156 (e.g., connectors 106a, 156a, 156b) supporting a plurality of photovoltaic panels 102/152 (e.g., photovoltaic panels 102a, 102b, 152a, 152b, 152c) above a ground. The apparatus may be part of a system 100/150 including the plurality of photovoltaic panels, such as a system for agricultural solar power generation or any other solar power generation system (e.g., on a highway, an urban areas, etc.). The apparatus may include a plurality of poles 120/170 (e.g., poles 120a, 120b, 170a, 170b, 170c) configured to support an assembly 122/172 (e.g., assemblies 122a, 122b, 172a, 172b, 172c) and the plurality of photovoltaic panels 102/152. At least a portion of the plurality of poles may each include a fixed portion 118/168 (e.g., fixed portions 118a, 118b, 168a, 168b, 168c) configured to be fixed on the ground and a moveable portion 116/166 (e.g., moveable portions 116a, 116b, 166a, 166b, 166c) configured to be moveably coupled to at least one of the fixed portion 118/168 and the assembly 122/172. The apparatus may have a closed configuration, such as depicted in FIGS. 1A and 1B. At the closed configuration, the moveable portion 116/166 supports the assembly 122/172 by being coupled to the fixed portion 118/168. The apparatus may have an open configuration, as described in greater detail elsewhere herein (see, e.g., FIGS. 2A, 2B, 3A, and 3B). At the open configuration the moveable portion 116/166 is detached from at least one of: the fixed portion 118/168 or the assembly 122/172.

The plurality of poles 120/170 may be configured to support a canopy of photovoltaic panels (such as the assembly 122/172 and the plurality of photovoltaic panels 102/152). The plurality of poles 120/170 may be organized in one or more rows. The plurality of poles 120/170 may be positioned in parallel, thereby creating a matrix of poles. The plurality of poles 120/170 may form a canopy base, such that the assembly 122/172 supported by the plurality of poles 120/170 forms a canopy. The canopy may be positioned, for example, over crops, vineyards, greenhouse, or the like. The distance between two or more neighboring poles may be sized such that a tractor may be configured to fit between two neighboring poles. The tractor may include any one or more of: agricultural machinery, a harvesting device, a harvester, a planter, a fertilizer, a sprayer, a sorter, and the like. The tractor may include any device (such as, for example, a vehicle, mobile or stationary) that may need to operate across, through, or around the one or more poles. The tractor may include a device for agricultural treatment (for example, instead of harvesting). The tractor may include a device configured for watering the crops. The tractor may include a robot configured to operate around the one or more poles. The robot may be configured to travel using one or more wheels. The robot may be configured to travel using a track or rail.

Neighboring poles may include consecutive poles in a row of poles. Neighboring poles may include consecutive poles in a column of poles. Neighboring poles may include two poles. The neighboring poles may be in different rows and/or columns. Neighboring poles may include diagonally neighboring poles. Two specific poles may be considered neighbors if there are no other poles positioned between the two specific poles. The distance between two or more neighboring poles may be determined based on the structure of the photovoltaic system and/or the object to be placed under the photovoltaic panels. For example, the distance between two or more neighboring poles may be between 0.5 and 3 meters. The distance between two or more neighboring poles may be between 1 and 2 meters. The distance between two or more neighboring poles may be between 0.5 and 1.5 meters.

The distance between two or more neighboring poles may be determined based on the weight of the assembly 122/172 and/or the photovoltaic panels 102/152. The plurality of poles 120/170 may be positioned (or distanced from each other) such that when a first pole of the plurality of poles 120/170 is in an open configuration, one or more neighboring poles of the first pole support the weight that the first pole has supported at the closed configuration thereof. In other words, the plurality of poles 120/170 may be arranged such that when a middle portion of one of the plurality of poles 120/170 is moved, at least a portion of the plurality of poles 120/170 are kept at the closed configuration, and the weight of the canopy is redistributed between the poles at the closed configuration.

The length of one or more of the plurality of the poles may be determined based on the height of the object to be placed under the photovoltaic panels. The length of one or more of the plurality of the poles (e.g., the distance between the ground and the assembly) may range between 1.5 and 4 meters. The length of one or more of the plurality of the poles may be at least 2 meters. The length of the one or more of the plurality of the poles may include the length of the fixed portion and the moveable portion.

The assembly 122/172 may be coupled to the plurality of photovoltaic panels 102/152. The assembly 122/172 may include one or more connectors (e.g., rods or poles) 106/156 configured to couple two or more photovoltaic panels 102/152. The assembly 122/172 may include a tracking system configured to set the orientation of the plurality of photovoltaic panels 102/152. The tracking system may include a rail 158 (e.g., rails 158a, 158b, 158c) configured to rotate about an axis of rotation 154 (e.g., axes of rotations 154a, 154b, 154c) and a motor 162 (e.g., motors 162a, 162b, 162c) configured to power the movement of the photovoltaic panels 102/152 about the axis of rotation. The motor 162 may be coupled to the rail 158 and/or the photovoltaic panels 102/152 via one or more cables 164 (e.g., cables 164a, 164b, 164c). The assembly 122/172 may include a connector 110/160 (e.g., connectors 110a, 110b, 160a, 160b, 160c) configured to couple to one of the poles of the plurality of poles 120/170. The connector 110/160 may couple to the moveable portion 116/166 of the pole. The assembly may include one or more sections configured to receive a holder of a tractor, thereby enabling the tractor to support the weight of the assembly 122/172. For example, the assembly 122/172 may include one or more sections configured to receive a holder of the tractor such that the tractor is supporting the weight of the assembly 122/172 while the moveable portion 116/166 is at the open configuration.

The connector 110/160 may include an element configured to integrate with a pole of the plurality of poles 120/170. The connector 110/160 may include a portion of the assembly 122/172 which extends towards a pole of the plurality of poles 120/170. The assembly 122/172 may include a plurality of connectors 110/160 configured to couple to the plurality of poles 120/170. The number of connectors 110/160 may correspond with the number of the plurality of poles 120/170. The number of connectors 110/160 may be greater than the number of the plurality of poles 120/170. The number of connectors 110/160 may be less than the number of the plurality of poles 120/170. The connectors 110/160 may be configured to couple to the moveable portion 116/166 at the closed configuration thereof. The connectors 110/160 may be configured to couple to the moveable portion 116/166 at the open configuration thereof. For example, the one or more connectors 110 may include second connectors (such as connectors 808, 918, 970a, 970b depicted in FIGS. 8, 9A, and 9B). The second connectors may be configured to receive (and/or fix the position of) the moveable portion at the open configuration thereof.

The connector 110/160 may include a first end configured to couple to any one or more of: the photovoltaic panels 102/152, the rail 158, and/or the axis of rotation 154. The connector 110/160 may include a second end configured to couple to the pole 120/170. The second end of the connector 110/160 may be configured to couple to the moveable portion 116/166 of the connector 110/160. The connector 110/160 may be sized and shaped to support the weight of the photovoltaic panels 102/152.

The apparatus may include one or more locking mechanisms configured to couple two or more portions together, such as, for example, a latch, a lever, an anchor, or a lock. The one or more locking mechanism may include a pair of magnets. The connector 110/160 may include one of the locking mechanisms. The locking mechanism may be configured to fix the moveable portion 116/166 to the connector 110/160. Alternatively, or additionally, the connector may include a recess or slot configured to receive the locking mechanism. The locking mechanism may be positioned on the moveable portion 116/166. The moveable portion 116/166 may be moveably coupled to the assembly 122/172. The moveable portion 116/166 may be detachable from the assembly 122/172. The moveable portion 116/166 may be coupled to the assembly 122/172 via a pivot or hinge.

The moveable portion 116/166 may include an element, such as a rod or a pole, configured to extend between the assembly 122/172 and the fixed portion 118/168. The moveable portion 116/166 may include one or more modular sections, such as described in greater detail elsewhere herein. A length of the moveable portion 116/166 may be between 0.3 and 3 meters. The length of the moveable portion 116/166 may be between 0.5 and 2 meters. The length of the moveable portion 116/166 may vary between the plurality of poles (or, for example, may vary within the matrix of the poles). The length of the moveable portion 116/166 may be sufficient for a tractor, such as a tractor, to pass under the assembly 122/172 and/or between the assembly 122/172 and the fixed portion 118/168. The moveable portion 116/166 may be at least partially composed of a lightweight material, such as, for example, aluminum alloy or carbon fiber, thereby reducing the amount of work needed for movement of the moveable portion 116/166.

The moveable portion 116/166 may be coupled to the fixed portion 118/168. The moveable portion 116/166 may be detachable from the fixed portion 118/168. The moveable portion 116/166 may be coupled to the fixed portion 118/168 via an axis of rotation, such as, for example, a pivot or a hinge. The fixed portion 118/168 may be configured to be fixed on the ground. The fixed portion 118/168 may include a trellis configured to enable crops to grow onto the fixed portion 118/168. The trellis may include any one or more of a stake, post, and wire. The fixed portion 118/168 may be configured to enable growth of crops while supporting the moveable portion 116/166 and/or the assembly 122/172.

The fixed portion 118/168 may include a rod configured to attach to the moveable portion 116/166. The fixed portion 118/168 may include a base configured to maintain the fixed portion 118/168 in/on the ground without movement. The base may include a plate, one or more screws, and/or a brace configured to support the fixed portion 118/168. The fixed portion 118/168 may include a rail, thereby enabling movement of the moveable portion 116/166 in relation to the fixed portion 118/168, such as described in greater detail elsewhere herein. The moveable portion 116/166 may be coupled to the fixed portion using one of the locking mechanisms, such as a latch, a lever, an anchor, or a lock, configured to fix the moveable portion 116/166 to the fixed portion 118/168. The locking mechanism may be positioned on the fixed portion 118/168 and the moveable portion 116/166 may include a recess or slot configured to receive the locking mechanism of the fixed portion. The locking mechanism may be positioned on the moveable portion 116/166 and the fixed portion 118/168, and may include a recess or slot configured to receive the locking mechanism of the moveable portion 116/166. The locking mechanism may be configured to lock the position of the moveable portion 116/166. Operation of the locking mechanism may be automatic, for example, by operation of the controller and/or the actuator. The automatic locking mechanism may include an electromagnetic lock.

The apparatus may include a controller configured to operate the locking mechanism. The controller may be operated using a software including code associated with the operation of the locking mechanism. The controller may include a computer, or a computing device, such as, for example, a laptop, smartphone, tablet, smartwatch, and the like. The controller may be operated via a user interface, such as a display screen of the computing device, or one or more buttons of the computing device. The controller may be operated automatically. The controller may be in communication with one or more sensors positioned on the one or more poles, the assembly, and/or the photovoltaic panels. The assembly may include one or more sensors configured to maintain a spatial orientation of at least one of the plurality of photovoltaic panels. The one or more poles may include one or more motion sensors and/or detectors configured to identify a nearing tractor. The controller may be operated automatically. The controller may be in communication with one or more sensors positioned on a tractor which may pass near one or more of the plurality of poles.

The one or more sensors may include at least one of: a motion sensor, a microphone, a global positioning system (GPS) sensor, a radiofrequency (RF) detector, or the like. The one or more sensors may be embedded in a computing device carried by a user. For example, the one or more sensors may include a GPS positioned on the tractor and/or a computing device carried by a user operating the tractor. The controller may be configured to detect the location of the tractor, and operate the actuator such that the moveable portion 116/166 is unlocked. For example, the one or more sensors may include an RF detector positioned on the tractor and/or a computing device carried by a user operating the tractor. The controller may be configured to detect the tractor, and operate the actuator such that the moveable portion 116/166 is unlocked. In other words, the controller may be configured to detect the tractor nearing one or more of the plurality of poles 120/170, and the controller may be configured to unlock one or more of the locking mechanisms locking one or more of the middle portions of the one or more poles near (or in the vicinity of) the tractor. The controller may be configured to operate the actuator such that the moveable portion 116/166 is moved. The controller may be configured to switch the one or more of the poles to the open configuration, for example, when detecting that a tractor is approaching the one or more poles. The controller may be configured to switch the one or more of the poles to the closed configuration, for example, after detecting the tractor is moving away (or increasing a distance) from the one or more poles. The controller may be configured to switch the one or more of the poles to the closed configuration, for example, when after detecting that the tractor is nearing a different pole, such as a neighboring pole of the one or more poles.

The controller may be configured to operate (e.g., from a closed configuration to an open configuration) a first pole, wherein the first pole may be a closest pole to a detected tractor. The controller may be configured to operate the opening of the one or more neighboring poles of the first pole. The controller may be configured to operate the opening of the one or more neighboring poles at a time difference configured to enable the tractor to move along the row and/or column with little or no waiting for opening and/or closing of the one or more poles. The controller may be configured to time the opening and/or closing of neighboring poles in real time. The controller may be configured to time the opening and/or closing of neighboring poles based on a detected location of the tractor. The controller may be configured to sync between openings and/or closings of rows and/or columns of the one or more poles. The controller may be configured to operate the opening and/or closing of the poles such that the poles are configured at the open configuration when the tractor is nearing the pole. The controller may be configured to operate the opening and/or closing of the poles such that the poles are configured at the closed configuration when the tractor is distancing away from the pole.

The controller may be configured to operate the closing and/or opening of the one or more poles based on the type of device (or tractor) that is moving towards (or away from) the one or more poles. For example, for a device (or tractor) that may extend across a plurality of columns when moving down a row, the controller may operate the opening and/or closing of a plurality of poles, wherein the poles may be in different columns, thereby accommodating the device. The controller may be configured to operate the one or more poles synchronously.

The controller may be configured to identify the one or more sensors. The controller may be configured to authorize and/or unauthorize one or more tractors. The controller may be configured to operate the closing and/or opening of the one or more poles only for authorized tractors. The controller may be configured to notify a user or administrator of a nearby unauthorized tractor or device.

The one or more sensors may be security sensors configured to detect and/or identify a signal associated with an authorized vehicle. For example, the one or more sensors may be able to detect an authorized vehicle that may be approaching, and send a signal to the controller which may command the adjustment of the moveable portion from a closed position to an open position (or vice versa). The one or more sensors may detect an unauthorized vehicle an send a signal to the controller such that an alarm or notification is sent from the controller to a user (or administrator).

The one or more sensors may be configured to detect a motion of a nearby vehicle. The one or more sensors may send data associated with the movement of the vehicle to the controller. The controller may store data associated with vehicle movement, such as, for example, data associated with all vehicle movement in the vicinity of the one or more sensors, and/or data associated with an individual vehicle.

The apparatus may include an actuator configured to drive the operation of the locking mechanism. The actuator may be configured to adjust the position of the moveable portion 116/166, or in other words, move the moveable portion 116/166 between the open configuration and the closed configuration. The actuator may be configured to switch between the open configuration and the closed configuration. The actuator may be configured to unlock and/or lock the position of the moveable portion 116/166 in relation to the assembly and/or the fixed portion 118/168. The locking mechanism may be configured to be released by the actuator. The actuator may include a motor. The motor may be in communication with the controller. The actuator may include one or more gears coupled to the motor. The one or more gears may be positioned on the pole such that operation of the locking mechanism may be performed using the one or more gears.

At the closed configuration, the moveable portion 116/166 may be configured to support the assembly 122/172. At the closed configuration, the fixed portion 118/168 may be configured to support the assembly 122/172 and the moveable portion 116/166. The closed configuration may include a configuration in which the moveable portion 116/166 is fixed between the fixed portion 118/168 and the assembly 122/172. The closed configuration may include a configuration in which the moveable portion 116/166 is locked between the fixed portion 118/168 and the assembly 122/172.

At the open configuration, the moveable portion 116/166 may be at least partially removed from the fixed portion 118/168 and/or the assembly 122/172, thus the fixed portion 118/168 may not be supporting the assembly 122/172 and/or photovoltaic panels. The open configuration may include one or more configuration in which the moveable portion 116/166 makes way for the tractor. The open configuration may include a configuration in which only a section of the moveable portion 116/166 is removed and/or adjusted, thereby making way for the tractor.

The moveable portion 166 may include a first end 174 (e.g., first ends 174a, 174b, 174c) and a second end 176 (e.g., second ends 176a, 176b, 176c). Although not shown in FIG. 1A, the moveable portion 116 may include one or more similar first ends. The first end (e.g., the first end 174) may be configured to abut and/or couple to the fixed portion 118/168. The fixed portion 118/168 may include a top surface, such as, for example, a base of a cylinder, configured to receive the first end. The top surface may be flat, thereby forming a stable base for supporting the weight and structure of the first end. The top surface may have a geometrical shape or one or more curves configured to receive the first end. The first end 164 may have a complementary shape configured to fit with the top surface of the fixed portion 118/168, thereby forming a locking mechanism. At the open configuration, the first end may be detached from the fixed portion 118/168.

The second end (e.g., the second end 176) may be configured to abut and/or couple to the assembly 122/172. The assembly 122/172 may include a bottom surface, such as, for example, a base of a cylinder, configured to receive the second end. A top surface of the second end may be flat, and the bottom surface of the assembly 122/172 may be flat, thereby forming a stable base for supporting the weight and assembly 122/172. The bottom surface of the assembly 122/172 may have a geometrical shape or one or more curves configured to receive the second end. The second end may have a complementary shape configured to fit with the bottom surface of the assembly 122/172, thereby forming a locking mechanism. At the open configuration, the second end may be detached from the assembly 122/172.

Figure 2A:
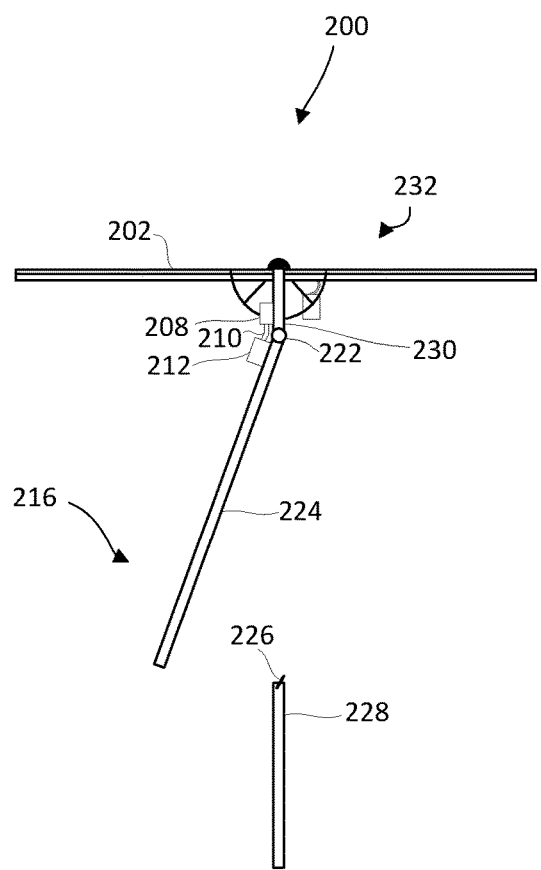
FIG. 2A and FIG. 2B show a pole with a moveable portion, supporting a photovoltaic panel.
Figure 2B:
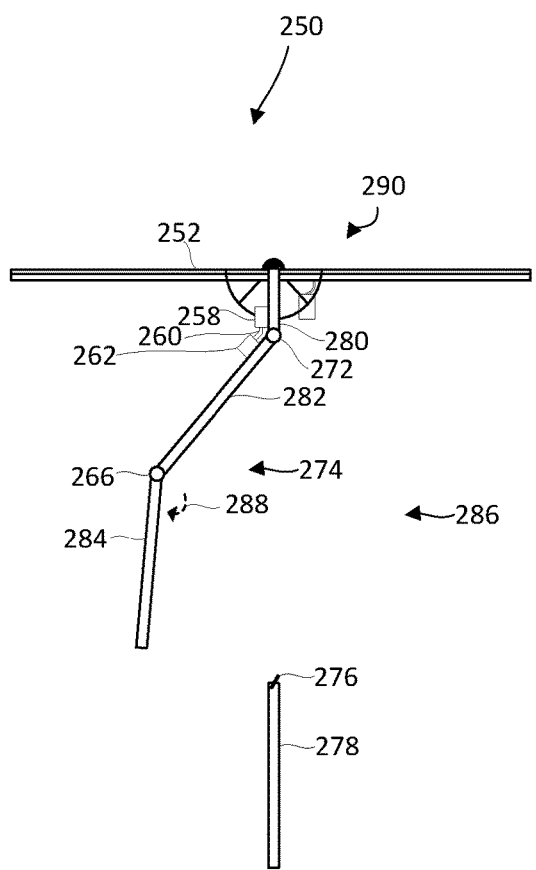

Reference is now made to FIG. 2A and FIG. 2B, which show a pole with a moveable portion, supporting a photovoltaic panel, and to FIG. 3A and FIG. 3B, which show a pole with a moveable portion, supporting a photovoltaic panel.

The apparatuses and/or photovoltaic panels 202/252/302/352 of systems 200/250/300/350 may be similar to and/or include at least a portion of the apparatuses and/or photovoltaic panels of systems 100/150. Alternatively, the apparatuses and/or photovoltaic panels of systems 100/150 may be similar to and/or include at least a portion of the apparatuses and/or photovoltaic panels of systems 200/250/300/350.

One or more poles 216/286/318/368 of the plurality of poles may have one or more pivots configured to enable movement of the moveable portion 224/274/332/386. The one or more pivots may be positioned between the moveable portion 224/274/332/386 and the assembly 232/290/334/388. The one or more pivots 222/266/272/324/374/392 may be positioned between the moveable portion 224/274/332/386 and the fixed portion 228/278/330/380. The one or more pivots 222/266/272/324/374/392 may be positioned between two or more sections 282/284/370/372 of the moveable portion 224/274/332/386. The one or more pivots 222/266/272/324/374/392 may include an axis of rotation and/or hinge. The one or more pivots 222/266/272/324/374/392 may be configured to couple between two or more sections (such as, for example, two or more sections 282/284/370/372 of the moveable portion 224/274/332/386, the moveable portion 224/274/332/386 and the assembly 232/290/334/388, and/or the moveable portion 224/274/332/386 and the fixed portion 228/278/330/380). The one or more pivots 222/266/272/324/374/392 may be configured to enable rotation of one section in relation to the other. The one or more pivots 222/266/272/324/374/392 may enable locking (or fixing) the position of one of the sections in relation to each other.

The moveable portion may include two or more sections 282/284/370/372. The moveable portion may include a first section 282/370 and a second section 284/372. The moveable portion may include two or more pivots. A first pivot may be positioned between the first section and the second section, thereby enabling a partial folding of the moveable portion. The first pivot may enable rotation of the first section in relation to the second section, such as depicted by arrows 288/382/384. The second pivot 272 may be positioned between the first section 282 and the assembly 280, such as depicted in FIG. 2B. The second pivot 374 may be positioned between the second section 372 and the fixed portion 380, such as depicted in FIG. 3B.

The one or more pivots 222/266/272/324/374/392 may include one or more locking mechanisms configured to be switched on/off be the controller 208/258/328/378. The controller 208/258/328/378 may be in communication with the one or more pivots 222/266/272/324/374/392. The controller 208/258/328/378 may be configured to operate the one or more pivots 222/266/272/324/374/392. The controller 208/258/328/378 may be configured to operate the one or more actuators 212/262/338/390. The one or more actuators 212/262/338/390 may be coupled to the controller 208/258/328/378 wirelessly, such as, for example, using Wi-Fi, Bluetooth, and the like. The controller 208/258/328/378 may be coupled to the one or more actuators 212/262/338/390 via a cable (or wire). The controller 208/258/328/378 and/or one or more actuators 212/262/338/390 may be configured to receive commands from a remote controller, such as, for example, a user-operated device.

The one or more actuators 212/262/338/390 may include one or more levers 210/260/326/376 configured to apply a force to the moveable portion 224/274/332/386, thereby causing movement thereof. The one or more actuators 212/262/338/390 and/or the one or more levers 210/260/326/376 may be configured to rotate the moveable portion 224/274/332/386 about the axis of rotation of the one or more pivots 222/266/272/324/374/392. The one or more actuators 212/262/338/390 may be configured to rotate the first section of the moveable portion in relation to the second section of the moveable portion.

The one or more actuators 212/262/338/390 may include any one or more of: a hydraulic actuator, a pneumatic actuator, and/or an electric actuator. The electric actuator may include any one or more of: an electromechanical actuator, an electrohydraulic actuator, a motor, a linear motor, a rotary motor, or the like. The one or more actuators 212/262/338/390 may include a thermal or magnetic element configured to trigger in response to a magnetic or thermal signal.

The moveable portion 224/274/332/386 of the pole 216/286/318/368 may be coupled to the assembly 230/280/314/364 and/or to the fixed portion via the one or more pivots 222/266/272/324/374/392. The one or more pivots 222/266/272/324/374/392 may include an axis of rotation. The moveable portion 224/274/332/386 may rotate about the axis of rotation. The axis of rotation may be a horizontal axis of rotation, or in other words, may be perpendicular to a longitudinal axis of the moveable portion 224/274/332/386. The pivot 222/272 may include a hinge. The first end of the pole 216/286 may be configured to detach from the fixed portion 228/278, thereby enabling the pole 216/286 to rotate about the pivot 222/272. The pivot may include a first locking mechanism configured to lock the moveable portion 224/274/332/386 to the assembly 230/280/314/364. The pivot may be configured to lock at the closed configuration such that a position of the moveable portion 224/274/332/386 in relation to the assembly 230/280/314/364 is fixed. The assembly 334/388 and/or the moveable portion 332/386 may include a locking mechanism 316/366 configured to lock the moveable portion 332/386 to the assembly 334/388.

The pole 216/286 may include a (second) locking mechanism 226/276 configured to lock the moveable portion 224/274 to the fixed portion 228/278. The locking mechanism between the moveable portion 224/274 and the fixed portion 228/278 may include a geometric shape lock. The top surface of the fixed portion 228/278, due to the shape thereof, may be mechanically locked with the moveable portion 224/274. The locking mechanism between the moveable portion 224/274 and the fixed portion 228/278 may include a lock configured to be switched on/off by the controller 208/258. The pole 318/386 may include a (second) locking mechanism 316/366 configured to lock the moveable portion 332/368 to the assembly 314/364. The locking mechanism between the moveable portion 332/368 and the assembly 314/364 may include a geometric shape lock. The bottom surface of the assembly 314/364, due to the shape thereof, may be mechanically locked with the moveable portion 332/368. The locking mechanism between the moveable portion 332/368 and the assembly 314/364 may include a lock configured to be switched on/off by the controller 328/378. The locking mechanism may be configured to lock the two or more sections 282/284/370/372 of the moveable portion 224/274/332/386. The locking mechanism may be configured to lock (or fix the position of) the first section in relation to the second section.

The controller 208/258/328/378 may be configured to operate the movement of the moveable portion 224/274/332/386. The controller 208/258/328/378 may operate the one or more actuators 212/262/338/390 and/or the one or more levers 210/260/326/376. The controller 208/258/328/378 may be configured to lock the one or more pivots 222/266/272/324/374/392. The controller may be configured to switch the locking mechanism from a locked state to an unlocked state. The controller 208/258/328/378 may be configured to switch the second pivot from the locked state to an unlocked state.

Reference is now made to FIG. 4A, FIG. 4B, and FIG. 4C, which show a pole with a moveable portion, supporting a photovoltaic panel. The system 400 may include one or more assemblies 440 coupled to one or more poles. The one or more poles may include a folding mechanism, such as, for example, the telescopic folding mechanism as depicted in figured 4A, 4B, and 4C. The one or more poles may include moveable portion 430 configured to telescopically fold. The one or more poles may include a moveable portion 430 configured to fold into the assembly 414 and/or the fixed portion 422.

The moveable portion 430 may be configured to support the assembly 440. The assembly 440 may include any one or more of the photovoltaic panel 402, tracker 408, controller 410, cable 412, and axis of rotation 404. The assembly 440 may be similar to and/or include one or more elements of any one or more of the assemblies 122/172/232/290/334/388 as described in greater detail elsewhere herein.

The moveable portion 430 may include two or more sections 418/420 configured to telescopically fold. The two or more sections 418/420 may include a first section 418 and a second section 420. The first section 418 may be removably coupled to the second section 420. The first section 418 and the second section 420 may be concentric. The second section 420 may include a cavity configured to receive the first section 418. The first section 418 may include a cavity configured to receive the second section 420. At the closed configuration, the moveable portion 430 may be at least partially folded. At the closed configuration, the second section 420 may sheath the first section 418 of the moveable portion 430. At the closed configuration, the first section 418 may sheath the second section 420 of the moveable portion 430.

The moveable portion 430 may be configured to detach from the assembly 414. The moveable portion 430 may be configured to detach from the fixed portion 422. The fixed portion 422 may include a cavity configured to receive the moveable portion 430 or at least a portion thereof. The cavity may extend within the ground beneath the fixed portion 422, such that the moveable portion 430 (or at least a portion thereof) may slide through the fixed portion 422 and into the ground. The assembly 414 may include a cavity configured to receive the moveable portion 430 or at least a portion thereof.

The configuration of the moveable portion 430 may be fixed using one or more locking mechanisms. The one or more locking mechanisms may include one or more locks 416/424/426. The one or more locks 416/424/426 and/or the locking mechanism may be couplable to the second section 420 and to the assembly 414. At the closed configuration, the lock (or locking mechanism) may fix the position of the moveable portion 430 in relation to the assembly 414. The one or more locks 416/424/426 and/or the locking mechanism may be configured to be coupled to the first section 418 and the second section 420. The lock 416/424/426 and/or the locking mechanism may be configured to fix the position of the first section 418 in relation to the second section 420. The one or more locking mechanisms may include one or more pins or latches configured to secure one or more sections of the moveable portion to each other and/or to the assembly and/or to the fixed portion. The one or more pins may be configured to insert into one or more openings along the moveable portion 430, such as, for example, in portions in which the first section 418 and the second section 420 may be coinciding (or overlapping).

The locking mechanism may be in communication with the controller 410. The controller 410 may send commands to, or operate, the locking mechanism. The controller may be configured to switch the locking mechanism from a locked state to an unlocked state.

The controller 410 may be configured to operate the movement of the moveable portion 430. The controller 410 may operate one or more actuators and/or motors 428 coupled to the moveable portion. The one or more actuators and/or motors 428 may be configured to slide the moveable 430 portion towards the fixed portion 422. The one or more actuators and/or motors 428 may be configured to slide the moveable 430 portion towards the assembly 414. The one or more actuators and/or motors 428 may be configured to slide the first section 418 into (or towards) the second section 420 (or vice versa).

Figure 5A:
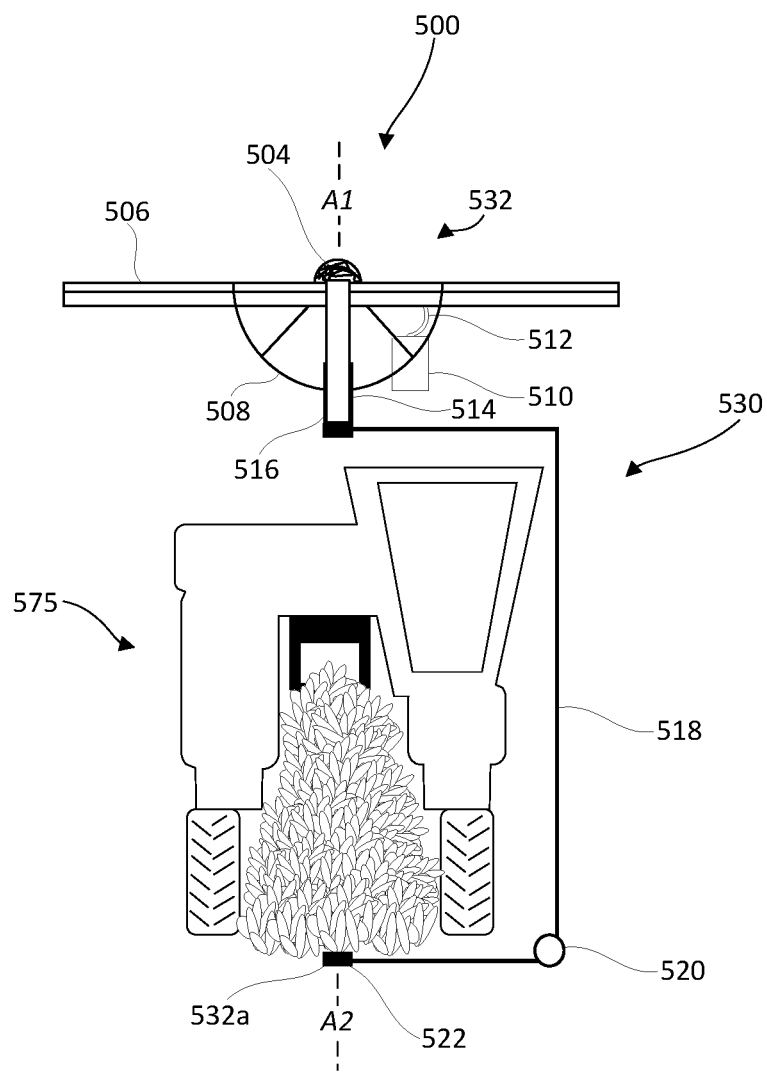
FIG. 5A shows a pole with a moveable portion, supporting a photovoltaic panel.
Figure 5B:
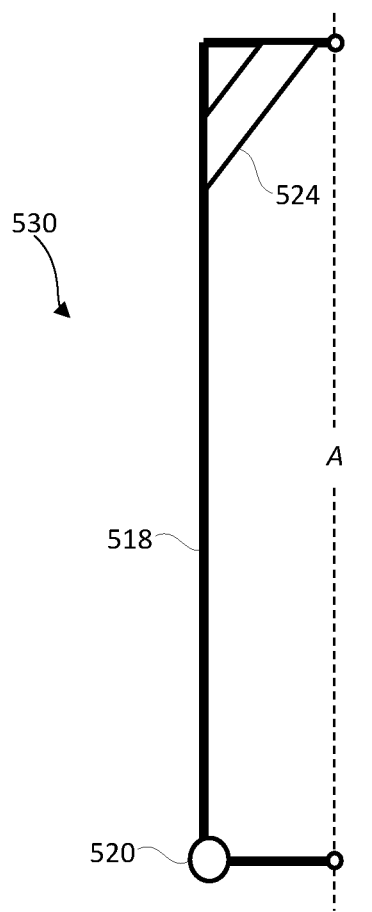
FIG. 5B shows a pole with a moveable portion.
Figure 5C:
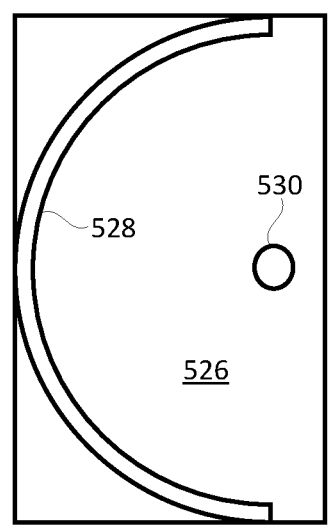
FIG. 5C shows a rail of the pole depicted in FIG. 5B.

Reference is made to FIG. 5A, which shows a pole with a moveable portion, supporting a photovoltaic panel, and to FIG. 5B, which shows a pole with a moveable portion, and to FIG. 5C, which shows a rail of the pole depicted in FIG. 5B. The system 500 as depicted in FIG. 5A may include a moveable portion 530 configured to rotate about any one of the fixed portion 522 and the assembly 532. The moveable portion 530, such as depicted in FIGS. 5A, 5B, and 5C, may be rotatable about an axis of rotation A thereby enabling the moveable portion 530 to rotate out of the way of a tractor 575, while enabling the weight distribution in the plurality of the poles to be maintained the same (or substantially the same) during rotation of one of the moveable portions 530. Each one of the plurality of poles may include more than one moveable portion 530.

The moveable portion 530 may include a rod 518 or bar shaped to connect between an assembly connector 514 and the fixed portion 522. The moveable portion 530 may be arched. The moveable portion 530 may be U-shaped. The moveable portion 530 may include an inner recess configured to surround the crop. The moveable portion 530 may be shaped such that the rod 518 surrounds one or more crops. The rod 518 may be shaped such that during rotation of the moveable portion 530, the rod 518 goes around the one or more crops and/or the tractor 575. The rod 518 may extend from a first end configured to couple to the assembly 532 to a second end configured to couple to the fixed portion 522. The moveable portion 530 may include one or more braces 524 configured to support the shape and weight of the one or more poles and/or the weight of the assembly which the one or more poles supports.

The moveable portion 530 may be configured to support the assembly 532. The assembly 532 may include any one or more of: the photovoltaic panel 506, tracker 508, controller 510, cable 512, and/or axis of rotation 504. The assembly 532 may be similar to and/or include one or more elements of any one or more of the assemblies 122/172/232/290/334/388/440 as described in greater detail elsewhere herein. The moveable portion 530 may be coupled to the assembly connector 514 via a first axis of rotation A1. The moveable portion 530 may include a recess 516 configured to receive at least a portion of the assembly connector 514, such as, for example, a connecting part of the assembly connector 514. The recess 516 of the moveable portion 530 may be configured to rotate about the connecting part of the assembly connector 514. The moveable portion 530 may be coupled to the assembly 532 via a pivot, a pin, and/or a hinge, about which the moveable portion 530 may be rotated. The range of rotation of the moveable portion 530 about the assembly connector 514 may exceed 360 degrees. The range of rotation of the moveable portion 530 about the assembly connector 514 may range between 180 degrees and 360 degrees. The range of rotation of the moveable portion 530 about the assembly connector 514 may range between 0 degrees and 180 degrees. The range of rotation of the moveable portion 530 about the assembly connector 514 may range between 30 degrees and 360 degrees.

The moveable portion 530 may be coupled to the fixed portion 522 via a second axis of rotation A2. The first axis of rotation A1 may be parallel to the second axis of rotation A2. The first axis of rotation A1 and the second axis of rotation A2 may coincide, such as depicted in axis A in FIG. 5B. The fixed portion 522 may include a base configured to couple to the moveable portion. The base (e.g., bases 532a, 532b) may include a ball sized to fit into a socket of the moveable portion 522. The base 532, such as base 532a of FIG. 5A, may include a rotating pivot configured to rigidly couple to the moveable portion 530. The moveable portion 530 may be rotatable coupled to the fixed portion 522 via a pivot, a pin, a ball, and/or a hinge. The moveable portion 530 may be configured to slide and/or roll on the ground and/or on a base 532 of the fixed portion 522. The moveable portion 530 may include a roller 520 configured to roll and/or slide on the ground and/or on the base 532 during rotation and/or movement of the moveable portion 530.

FIG. 5C shows a top view of the base 532b (e.g., the plane shown in FIG. 5 may be perpendicular to the axis A in FIG. 5B). The fixed portion may include a base 532b, such as depicted in FIG. 5C, configured to support the moveable portion 530 during a rotation thereof. The base 532b may include a plate 526 onto which the moveable portion 530 and/or the roller 520 of the moveable portion 530 may roll and/or slide. The base 532b may include a slot or rail 528 configured to receive a portion of the moveable portion 530, such as the roller 520.

Figure 6A:
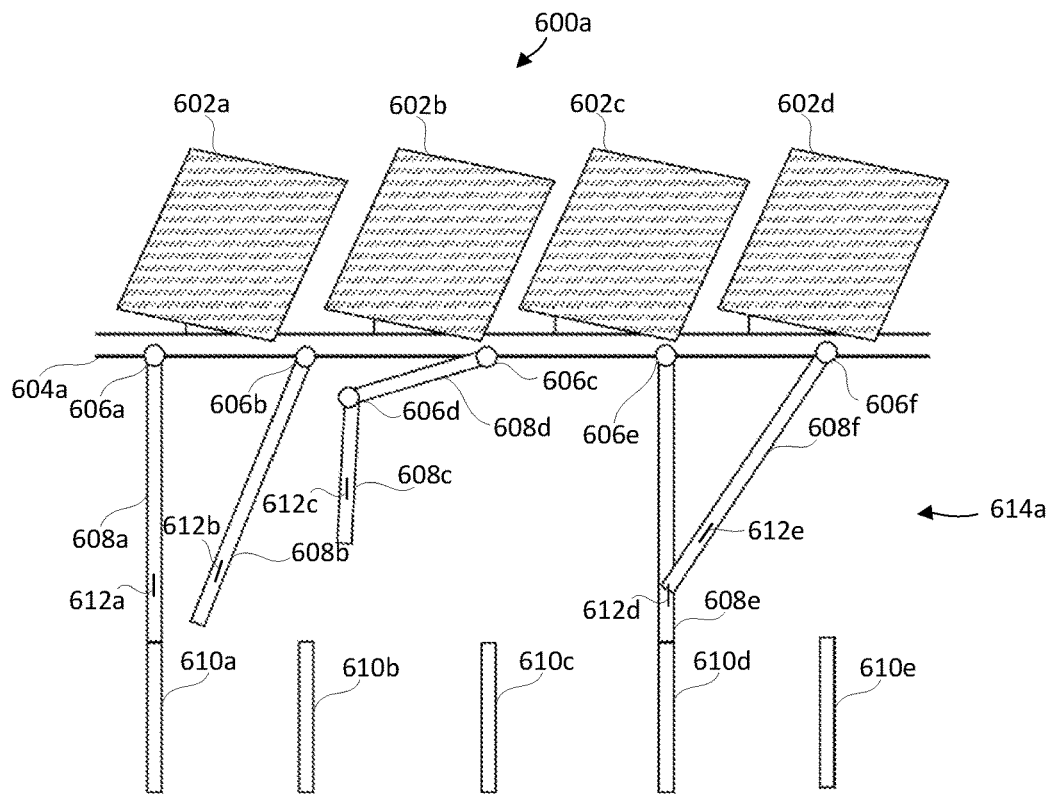
FIG. 6A and FIG. 6B show a plurality of poles supporting a plurality of photovoltaic panels.
Figure 6B:
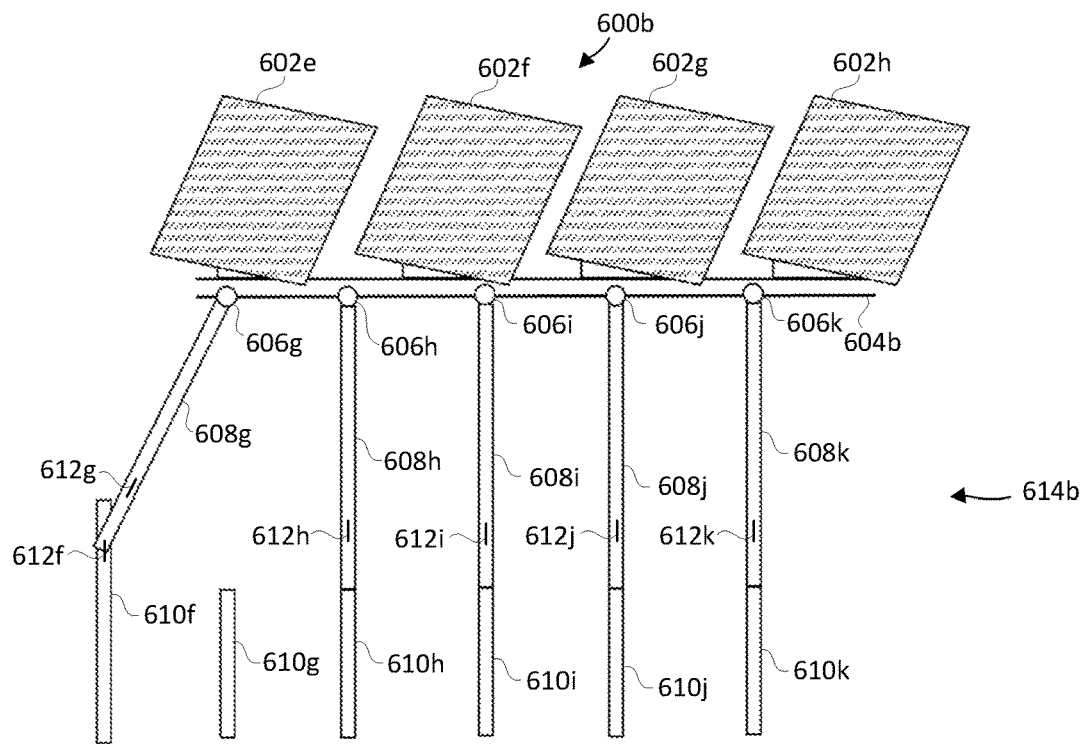

Reference is made to FIG. 6A and FIG. 6B, which show a plurality of poles supporting a plurality of photovoltaic panels. FIG. 6A and FIG. 6B depict exemplary rows of a plurality of poles 614a and 614b, respectively. The plurality of poles 614 (e.g., the poles 614a, 614b) may be supporting a plurality of photovoltaic panels 602 (e.g., photovoltaic panels 602a, 602b, 602c, 602d, 602e, 602f, 602g, 602h). The plurality of photovoltaic panels 602 may be connected to the plurality of poles 614 via the connector 604 (e.g., connectors 604a, 604b) of the assembly 600 (e.g., assemblies 600a, 600b). One or more of the moveable portions 608 (e.g., moveable portions 608a, 608b, 608c, 608d, 608e, 608f, 608g, 608h, 608i, 608j, 608k) of the plurality of poles 614 may be coupled to the assembly 600 via one or more pivots 606 (e.g., pivots 606a, 606b, 606c, 606d, 606e, 606f, 606g, 606h, 606i, 606j, 606k), such as, for example, as depicted in FIGS. 2A and 2B. One or more of the moveable portions 608 of the plurality of poles 614 may be coupled to the one or more fixed portions 610 (e.g., fixed portions 610a, 610b, 610c, 610d, 610e, 610f, 610g, 610h, 610i, 610j, 610k) via one or more pivots 606, such as, for example, as depicted in FIGS. 3A and 3B. One or more of the moveable portions 608 in the row of plurality of poles 614 may include an anchor 612 (e.g., anchors 612a, 612b, 612c, 612d, 612e, 612f, 612g, 612h, 612i, 612j, 612k) positioned thereon. Alternatively, or additionally, the anchor 612 may be positioned on the fixed portion 610 or any other portion of the poles such that the moveable portion 608 may be fixed onto another pole using the anchor 612. Thus, in an open configuration of the pole, the moveable portion thereof may be fixed onto a different pole and/or portion thereof. The anchor 612 may be sized and positioned such that the moveable portion 608 of a first pole (such as, for example, moveable portion 608f) may be locked onto a second pole (such as, for example, the pole of the moveable portion 608c) using the anchor 612 (such as, for example, the anchor 612d). The first pole and the second pole may be neighboring poles in the same row. The first pole and the second pole may be neighboring poles in the same column. The first pole and the second pole may be diagonally neighboring poles in a matrix (a plurality of rows and columns) of poles.

One or more fixed portions (e.g., fixed portions 610b, 610c) detached from a moveable portion may be configured to slide into the ground (e.g., so that an object may be placed under the assembly 600 without damaging the one or more detached fixed portions and/or the object).

The row, column, and/or matrix of the plurality of poles 614 may include one or more additional fixed portions 610 configured to couple to one or more moveable portions 612 at an open configuration thereof, for example, such as the additional fixed portion 610f as depicted in FIG. 6B. The one or more additional fixed portions may include one or more anchors, such as the anchors 612 (e.g., an anchor 612f) configured to fix the position of the moveable portion 612 of a nearby pole thereto. The one or more additional fixed portions may be positioned between the plurality of poles 614. The one or more additional fixed portions may be positioned at the end of a row or column of the plurality of poles. Thus, anchoring the moveable portion to a nearby fixed portion enables the moveable portion to continue supporting the weight of the canopy and/or assembly at an open configuration thereof, thereby preventing sagging of the canopy and/or assembly.

Figure 7:
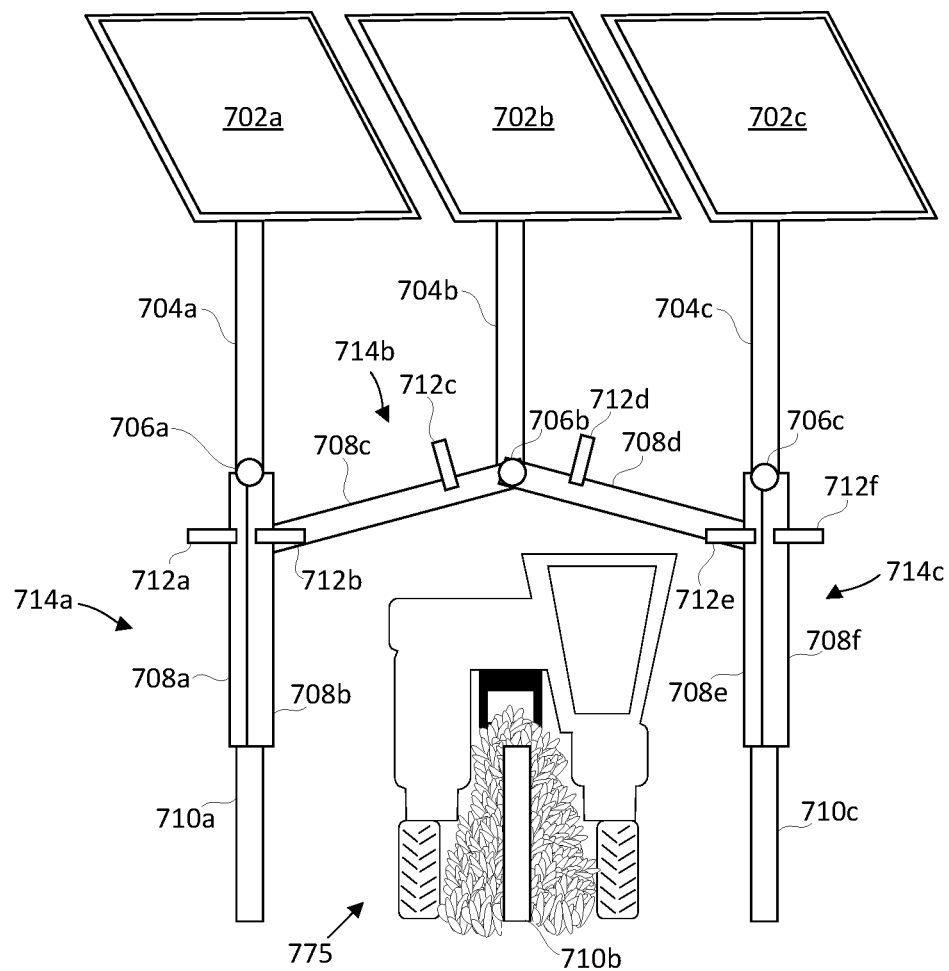
FIG. 7 shows a plurality of poles supporting a plurality of photovoltaic panels.

Reference is made to FIG. 7, which shows a plurality of poles supporting a plurality of photovoltaic panels. As depicted in FIG. 7, the plurality of poles may include one or more moveable portions 714 (e.g., moveable portions 714a, 714b, 714c) including two or more sections 708 (e.g., sections 708a, 708b, 708c, 708d, 708e, 708f) coupled by one or more pivots 706 (e.g., pivots 706a, 706b, 706c). The moveable portion may be coupled to one or more photovoltaic panels 702 (e.g., photovoltaic panels 702a, 702b, 702c) via one or more assembly connectors 704 (e.g., assembly connectors 704a, 704b, 704c). The two or more sections 708 may include a rod or bar configured to extend between the assembly connectors 704 and fixed portions 710 (e.g., fixed portions 710a, 710b, 710c), such that at a closed configuration of the pole, the two or more sections 708 of the moveable portions 714 are supporting at least a portion of the weight of the assembly connector 704 and/or the one or more photovoltaic panels 702, such as depicted in the moveable portions 714a and 714c in FIG. 7. Each of the two or more sections 708 may be sized and structured to support the weight of the assembly 704 and/or the one or more photovoltaic panels 702, together and/or alone. At a closed configuration, each of the two or more sections may reach (or abut) the fixed portion 710). At a closed configuration, at least one of the two or more sections may reach (or abut) the fixed portion 710). The two or more sections 708 of the moveable portions 714 may be rotatable about the pivot 706, and rotation of the two or more sections may enable switching of the movable portion from the closed configuration to the open configuration.

At the open configuration of the one or more poles, the two or more sections 708 of the moveable portions 714 may be anchored to different nearby (or neighboring) poles. The two or more sections 708 of the moveable portions 714 may be anchored using the one or more anchors 712 (e.g., anchors 712a, 712b, 712c, 712d, 712e, 712f). At the open configuration, the two or more sections 708 may each be anchored to nearby poles such that a tractor 775 may be able to pass between the assembly connectors 704 and the fixed portions 710, such as depicted by the moveable portion 714b, which is anchored to nearby poles in FIG. 7.

Figure 8:
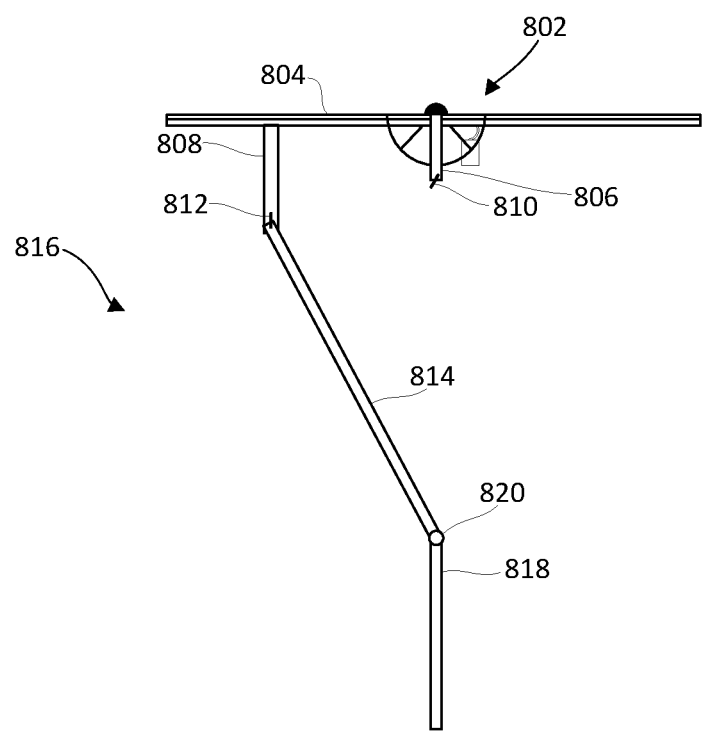
FIG. 8 shows a pole with a moveable portion, supporting a photovoltaic panel.

Reference is made to FIG. 8, which shows a pole with a moveable portion, supporting a photovoltaic panel. As depicted in FIG. 8, at an open configuration, the moveable portion 814 of the one or more poles 816 may be anchored to a second connector 808 (e.g., one or more assembly connectors described herein). Advantageously, having the moveable portion 814 connected to the second connector 808 at an open configuration of the moveable portion enables the moveable portion 814 to support the weight of the assembly 802 while enabling a tractor to pass between the assembly 802 and the fixed portion 818. The moveable portion 814 may be coupled to the fixed portion 818 via a pivot 820, which may be similar to the one or more moveable portions of the one or more poles depicted in FIGS. 3A and 3B. At the closed configuration, the moveable portion 814 may be coupled to (e.g., via one or more assembly connectors 806) the assembly 802 including one or more solar panels 804, one or more connectors 806 and/or one or more locking mechanisms 810. At the closed configuration, the one or more moveable portions 814 may extend between the assembly 802 and the fixed portion 818, thereby supporting the weight of the assembly 802.

The second connector 808 may be similar to the connector 806 of the assembly 802. The second connector may include a member including the locking mechanism 812. The second connector may be coupled to the assembly 802 such that the solar panels are moveable using the tracking system. The fixed portion 818 may be coupled to the assembly via a base, such that the distribution of the weight of the assembly is essentially the same at the open configuration as at the closed configuration. One or more of the connectors, or second connectors, may be positioned between rows and/or columns of the plurality of poles. The one or more connectors (or second connectors) may be spaced apart. The distance between two or more connectors (and/or second connectors) may be, for example, between 0.3 to 1.5 meters. The distance between two or more connectors (and/or second connectors) may be, for example, between 0.25 to 0.8 meters.

Reference is made to FIG. 9A and FIG. 9B, which show a pole supporting a photovoltaic panel. Moveable portions 926/978 may be coupled to the assemblies 900/950 via one or more pivots 906/956. The moveable portions 926/978 may include two or more sections (e.g., sections 980a/980b, such as depicted in FIG. 9B), and the two or more sections may be each coupled to the assemblies 900/950 via one or more pivots 906/956. The two or more sections 980a/980b may be coupled to the assembly 950 via a single pivot 956. The one or more pivots 906/956 may be configured to enable rotation of the moveable portions 926/978 in relation to the connectors 904/954 of the assemblies 900/950. The moveable portions 926/978 may be configured to couple to the fixed portions 916/966. The moveable portions 926/978 may be configured to be fixed to the fixed portions 916/966 using one or more locking mechanisms 914/964, such as described in greater detail elsewhere herein.

The locking mechanism coupling between the moveable portions 926/978 and the assemblies 900/950 may include one or more pulleys 922/974 (e.g., pulleys 974a, 974b). The one or more pulleys 922/974 may be coupled the movable portions 926/978 via one or more cables 924/976 (e.g., cables 976a, 976b). The one or more cables 924/976 may be coupled to any one or more of the sections 908/912/958/962 (e.g., section 958a, 958b, 962a, 962b) of the moveable portions 926/978. The one or more cables 924/976 may be coupled to one or more pivots 910/960 (e.g., pivots 960a, 960b) of the moveable portions 926/978. The one or more cables 924/976 may be coupled to one or more pivots 910/960 coupling between two or more sections 908/912/958/962 of the moveable portions 926/978. The one or more pulleys 922/974 may be coupled to one or more connectors and/or second connectors 918/970 (e.g., second connectors 970a, 970b). The one or more second connectors 918/970 may be coupled to the assemblies 900/950 via the base 968. The base 968 may be coupled to the connector 954 of the assembly 950. Advantageously, coupling the one or more pulleys 922/974 to the base 968 may enable the weight distribution of the moveable portion 978 to be balanced.

At the closed configuration, the cables 924/976 may extend such that the moveable portion 926/978 is set between the assembly 900/950 and the fixed portion 916/966, thereby enabling the moveable portion 926/978 to support the weight of the assembly 900/950. The cables 924/976 and/or the one or more pulleys 922/974 may be coupled to the controller 920/972 (e.g., controllers 972a, 972b). The controller may operate the rotation of the one or more pulleys 922/974 such that at the closed configuration, the length of the cables 924/976 is sufficient to enable the movable portion 926/978 to be positioned between the assembly 900/950 and the fixed portion 916/966. The controller 920/972 may operate the rotation of the one or more pulleys 922/974 such that at the open configuration, the length of the cables 976 may be shorter than the length of the cables 976 at the closed configuration, thereby pulling the moveable portion 926/978 away from between the assembly 900/950 and the fixed portion 916/966.

Figure 10:
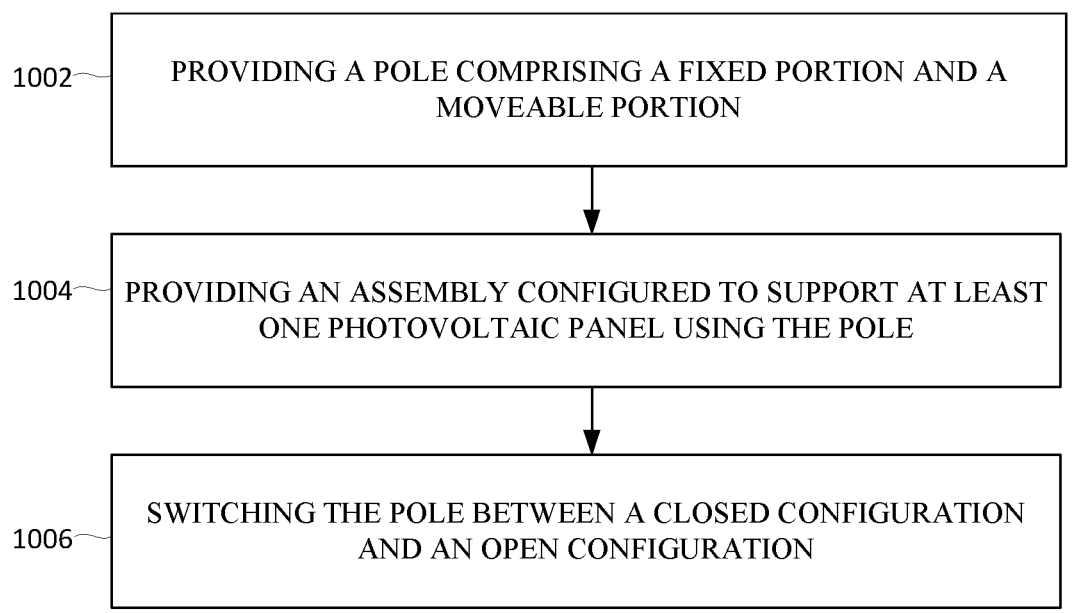
FIG. 10 shows a flow chart for a method of operating an adjustable supporting structure associated with one or more photovoltaic panels.

Reference is made to FIG. 10, which shows a flow chart for a method of operating an adjustable supporting structure associated with one or more photovoltaic panels. The method may include one or more steps for installing and/or operating an apparatus, such as the apparatus described herein and/or depicted in any one or more of the FIGS. 1A, 1B, 2A, 2B, 3A, 3B, 4A, 4B, 4C, 5A, 5B, 5C, 6A, 6B, 7, 8, 9A, and/or 9B.

The method may include, at step 1002, providing one or more poles (e.g., at least a portion of the one or more poles include a fixed portion and a moveable portion). At step 1004, the method may include providing one or more assemblies configured to support one or more photovoltaic panels above a crop. The method may include coupling the one or more assemblies to the one or more poles, such that the one or more poles support the one or more assemblies above a crop. The method may include providing one or more locking mechanisms. The method may include positioning the one or more locking mechanism onto any one or more of: the fixed portion, the movable portion, and/or the assembly. The method may include coupling one or more controllers to the locking mechanism. The method may include providing one or more motors and/or actuators. The method may include coupling the one or more motors and/or actuators to any one or more of the fixed portion, the movable portion, and the assembly, such that the one or more motors and/or actuators are configured to drive a movement of the moveable portion in relation to the fixed portion and/or the assembly.

The method may include fixing the fixed portion of the pole to a ground. The method may include fixing the fixed portion to the ground of crops or agriculture, such as described in greater detail elsewhere herein. The method may include coupling the movable portion of the pole to the fixed portion. The method may include coupling the moveable portion to the assembly. The method may include setting the moveable portion such that the one or more poles is at the closed configuration. The method may include setting the moveable portion such that the one or more poles is at the open configuration. The method may include, at step 1006, switching the pole between the closed configuration and the open configuration. The method may include switching from the closed configuration (e.g., the moveable portion may be configured to support the assembly by being coupled to the fixed portion) to the open configuration (e.g., the moveable portion is detached from at least one of: the fixed portion and/or the assembly). The method may include switching from the open configuration (e.g., the moveable portion is detached from at least one of: the fixed portion and/or the assembly) to the closed configuration (e.g., the moveable portion is configured to support the assembly by being coupled to the fixed portion).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The claim set as filed in the priority-providing application is repeated herein as clauses in order to preserve that subject matter in the present application. The present application also discloses:

Clause 1: An apparatus comprising:
an assembly supporting a plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly, wherein the moveable portion is configured to:
at a closed configuration, support the assembly by being coupled to the fixed portion; and
at an open configuration, be detached from at least one of:
the fixed portion; or
the assembly.

Clause 2: The apparatus according to clause 1, wherein the plurality of poles are spaced apart at a distance corresponding to a dimension of a tractor.

Clause 3: The apparatus according to any one of clauses 1-2, wherein the moveable portion comprises a first end configured to couple to the fixed portion, and wherein at the open configuration, the first end is detached from the fixed portion.

Clause 4: The apparatus according to any one of clauses 1-3 wherein the moveable portion comprises a second end configured to couple to the assembly, and wherein at a second open configuration, the second end is detached from the assembly.

Clause 5: The apparatus according to any one of clauses 1-4 wherein at the closed configuration, the moveable portion is locked between the assembly and the fixed portion.

Clause 6: The apparatus according to any one of clauses 1-5 comprising a lock configured to lock the moveable portion between the assembly and the fixed portion.

Clause 7: The apparatus according to clause 6 wherein the lock is configured to automatically lock, based on the moveable portion contacts a portion of the assembly or the fixed portion, the moveable portion between the assembly and the fixed portion.

Clause 8: The apparatus according to any one of clauses 6-7 wherein the lock is configured to lock the moveable portion to the assembly.

Clause 9: The apparatus according to any one of clauses 6-8 wherein the lock is configured to lock the moveable portion to the fixed portion.

Clause 10: The apparatus according to any one of clauses 6-9 wherein the lock comprises a lever.

Clause 11: The apparatus according to any one of clauses 1-10 further comprising an actuator configured to switch between the open configuration and the closed configuration.

Clause 12: The apparatus according to any one of clauses 5-11 wherein the lock is configured to be released by the actuator.

Clause 13: The apparatus according to any one of clauses 10-12, further comprising a controller configured to operate the actuator.

Clause 14: The apparatus according to any one of clauses 10-13 wherein the actuator comprises a motor and a gear.

Clause 15: The apparatus according to any one of clauses 4-14, wherein each of the plurality of poles further comprises a hinge disposed between the second end and the assembly, and wherein the hinge is configured to rotate the moveable portion around an axis of rotation of the hinge.

Clause 16: The apparatus according to clause 15 wherein the hinge is configured to lock the moveable portion at the closed configuration such that a position of the moveable portion in relation to the assembly is fixed.

Clause 17: The apparatus according to any one of clauses 3-16 further comprising a second lock configured to couple to the first end and the fixed portion, wherein at the closed configuration, the second lock is configured to fix the position of the moveable portion in relation to the fixed portion.

Clause 18: The apparatus according to any one of clauses 11-17 wherein the controller is configured to switch the lock from a locked state to an unlocked state.

Clause 19: The apparatus according to any one of clauses 11-18 wherein the actuator is configured to rotate the moveable portion around the axis of rotation of the hinge.

Clause 20: The apparatus according to any one of clauses 1-19 wherein the moveable portion comprises a first section, a second section, and a second hinge, and wherein the first section is moveably coupled to the second section via the second hinge.

Clause 21: The apparatus according to clause 20 wherein the second hinge is configured to lock a connected portion of the first section and a connected portion of the second section such that the position of the first section is fixed in relation to the second section.

Clause 22: The apparatus according to clause 21 wherein the controller is configured to switch the second hinge from a locked state to an unlocked state.

Clause 23: The apparatus according to any one of clauses 11-22 wherein the actuator is configured to rotate the first section around an axis of rotation of the second hinge.

Clause 24: The apparatus according to any one of clauses 4-23 wherein the fixed portion comprises a cavity configured to receive the moveable portion.

Clause 25: The apparatus according to any one of clauses 4-14 wherein the second end is configured to detach from the assembly, and wherein the moveable portion comprises a cavity configured to receive the fixed portion.

Clause 26: The apparatus according to any one of clauses 4-14 or 24-25, further comprising a lock configured to couple to the second end and the assembly, wherein at the closed configuration, the lock is configured to fix the position of the moveable portion in relation to the assembly.

Clause 27: The apparatus according to any one of clauses 13-14 or 24-26, wherein the controller is configured to switch the lock from a locked state to an unlocked state.

Clause 28: The apparatus according to any one of clauses 11-14 or 24-25, wherein the actuator is configured to slide the moveable portion towards the fixed portion.

Clause 29: The apparatus according to any one of clauses 4-14 or 24-28, wherein the moveable portion comprises a first section and a second section, wherein the first section is removably coupled to the second section, and wherein the second section comprises a cavity configured to receive the first section.

Clause 30: The apparatus according to clause 29, wherein the first section and the second section are concentric.

Clause 31: The apparatus according to any one of clauses 4-14 or 24-30, further comprising a second lock, wherein at the closed configuration, the second lock is coupled to the first section and the second section, and wherein the second lock is configured to fix the position of the first section in relation to the second section.

Clause 32: The apparatus according to clause 31 wherein the controller is configured to switch the second lock from a locked state to an unlocked state.

Clause 33: The apparatus according to any one of clauses 29-32, wherein the actuator is configured to slide the second section towards the first section.

Clause 34: The apparatus according to any one of clauses 29-33, wherein the distance between the assembly and the ground is at least two meters.

Clause 35: The apparatus according to any one of clauses 29-34, wherein the fixed portion comprises a trellis configured to enable crops to grow on the fixed portion.

Clause 36: The apparatus according to clause 35, wherein the trellis comprises at least one of: stakes, posts, or wires.

Clause 37: The apparatus according to any one of clauses 29-36, wherein the assembly comprises a section configured to receive a holder of a tractor.

Clause 38: The apparatus according to any one of clauses 29-37, wherein the assembly comprises a sensor configured to maintain a spatial orientation of at least one of the plurality of photovoltaic panels.

Clause 39: A system comprising:
a plurality of photovoltaic panels; and
an apparatus comprising:
an assembly supporting the plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly,
wherein the moveable portion is configured to:
at a closed configuration, support the assembly by being coupled to fixed portion; and
at an open configuration, be detached from at least one of:
the fixed portion; or
the assembly.

Clause 40: The system according to clause 39, wherein the plurality of poles are spaced apart at a distance corresponding to a dimension of a tractor.

Clause 41: A method comprising:
providing an assembly configured to support at least one photovoltaic panel above an object;
providing a pole comprising a fixed portion and a moveable portion;
fixing the fixed portion of the pole to a ground;
coupling, for a closed configuration, the movable portion of the pole to the fixed portion and the assembly so that the moveable portion supports the assembly by being coupled to fixed portion; and
decoupling, for an open configuration and to accommodate the object in a space under the assembly, the moveable portion from at least one of:
the fixed portion; or
the assembly.

Clause 42: A method comprising:
providing an assembly configured to support at least one photovoltaic panel above an object;
providing a pole comprising a fixed portion and a moveable portion, wherein the fixed portion is fixed to a ground, and wherein for a closed configuration, the movable portion is coupled to the fixed portion and the assembly; and
switching the pole from the closed configuration to an open configuration, wherein at the closed configuration, the moveable portion is configured to support the assembly by being coupled to the fixed portion, and wherein at the open configuration, the moveable portion is detached from at least one of:
the fixed portion; or
the assembly.

Clause 43: An apparatus comprising:
an assembly supporting a plurality of photovoltaic panels above a ground;

a plurality of poles configured to support the assembly and the plurality of photovoltaic panels, wherein each of the plurality of poles comprises:
a fixed portion configured to be fixed on the ground; and
a moveable portion configured to be moveably coupled to the fixed portion and the assembly, wherein the moveable portion is coupled to:
the assembly via a first axis of rotation; and
the fixed portion via a second axis of rotation.

Clause 44: The apparatus according to clause 43, wherein the fixed portion comprises a base configured to enable the moveable portion to slide into the fixed portion.

Clause 45: The apparatus according to clause 44, wherein the base comprises a rail.

Clause 46: The apparatus according to any one of clauses 43-44, wherein the moveable portion comprises a U-shaped portion, and wherein a recess of the U-shaped portion is configured to surround an object placed under the assembly.

Clause 47: An apparatus comprising:
an assembly supporting a plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly,
wherein the moveable portion is configured to:
at a closed configuration, support the assembly by being coupled to fixed portion; and
at an open configuration, be detached from at least one of:
the fixed portion; or
the assembly;
wherein the moveable portion comprises an anchor, and wherein the moveable portion of a first pole of the plurality of poles is configured to lock onto a second pole of the plurality of poles using the anchor.

Clause 48: The apparatus according to clause 47, wherein the first pole and the second pole are neighboring poles.

Clause 49: The apparatus according to any one of clauses 47-48, wherein the moveable portion of the first pole comprises at least two rods, and wherein each of the at least two rods is configured to couple to a different neighboring pole.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
an assembly supporting a plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly, wherein the moveable portion is configured to:
at a closed configuration, support the assembly by being coupled to the fixed portion; and
at an open configuration, be detached from at least one of:
the fixed portion; or
the assembly.

2. The apparatus of claim 1, wherein the moveable portion comprises a first end configured to couple to the fixed portion, and wherein at the open configuration, the first end is detached from the fixed portion.

3. The apparatus of claim 1, wherein the moveable portion comprises a second end configured to couple to the assembly, and wherein at a second open configuration, the second end is detached from the assembly.

4. The apparatus of claim 1, comprising a lock configured to lock the moveable portion between the assembly and the fixed portion.

5. The apparatus of claim 4 wherein the lock is configured to lock the moveable portion to the assembly.

6. The apparatus of claim 4, wherein the lock is configured to lock the moveable portion to the fixed portion.

7. The apparatus of claim 1, further comprising an actuator configured to switch between the open configuration and the closed configuration.

8. The apparatus of claim 7, wherein the lock is configured to be released by the actuator.

9. The apparatus of claim 7, further comprising a controller configured to operate the actuator.

10. The apparatus of claim 7, wherein the actuator comprises a motor and a gear.

11. The apparatus of claim 3, wherein each of the plurality of poles further comprises a hinge disposed between the second end and the assembly, and wherein the hinge is configured to rotate the moveable portion around an axis of rotation of the hinge.

12. The apparatus of claim 7, wherein the actuator is configured to rotate the moveable portion around the axis of rotation of the hinge.

13. The apparatus of claim 1, wherein the fixed portion comprises a trellis configured to enable crops to grow on the fixed portion.

14. The apparatus of claim 1, wherein the assembly comprises a section configured to receive a holder of a tractor.

15. A system comprising:
a plurality of photovoltaic panels; and
an apparatus comprising:
an assembly supporting the plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly,
wherein the moveable portion is configured to:
at a closed configuration, support the assembly by being coupled to fixed portion; and
at an open configuration, be detached from at least one of:
the fixed portion; or
the assembly.

16. The system of claim 15, wherein the plurality of poles are spaced apart at a distance corresponding to a dimension of a tractor.

17. A method comprising:

providing an assembly configured to support at least one photovoltaic panel above an object;
providing a pole comprising a fixed portion and a moveable portion;
fixing the fixed portion of the pole to a ground;
coupling, for a closed configuration, the movable portion of the pole to the fixed portion and the assembly so that the moveable portion supports the assembly by being coupled to fixed portion; and
decoupling, for an open configuration and to accommodate the object in a space under the assembly, the moveable portion from at least one of:
the fixed portion; or
the assembly.

18. An apparatus comprising:
an assembly supporting a plurality of photovoltaic panels above a ground;
a plurality of poles configured to support the assembly and the plurality of photovoltaic panels, wherein each of the plurality of poles comprises:
a fixed portion configured to be fixed on the ground;
a moveable portion configured to be moveably coupled to at least one of: the fixed portion or the assembly, wherein the moveable portion is configured to:
at a closed configuration, support the assembly by being coupled to fixed portion; and
at an open configuration, be detached from at least one of:
the fixed portion; or
the assembly;
wherein the moveable portion comprises an anchor, and wherein the moveable portion of a first pole of the plurality of poles is configured to lock onto a second pole of the plurality of poles using the anchor.

19. The apparatus of claim 18, wherein the first pole and the second pole are neighboring poles.

20. The apparatus of claim 18, wherein the moveable portion of the first pole comprises at least two rods, and wherein each of the at least two rods is configured to couple to a different neighboring pole.

* * * * *